United States Patent
Charnevich et al.

(10) Patent No.: US 10,802,761 B2
(45) Date of Patent: Oct. 13, 2020

(54) WORKLOAD PREDICTION IN MEMORY SYSTEM AND METHOD THEREOF

(71) Applicant: SK hynix Inc., Gyeonggi-do (KR)

(72) Inventors: Aliaksei Charnevich, Minsk (BY); Siarhei Zalivaka, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 19 days.

(21) Appl. No.: 16/365,886

(22) Filed: Mar. 27, 2019

(65) Prior Publication Data
US 2019/0303043 A1 Oct. 3, 2019

Related U.S. Application Data

(60) Provisional application No. 62/648,757, filed on Mar. 27, 2018.

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .......... G06F 3/0604; G06F 3/0679; G06F 2212/7203; G06F 3/0659; G06F 13/16; G06F 3/0673; G06F 3/061

USPC ......................................................... 711/154
See application file for complete search history.

(56) References Cited

U.S. PATENT DOCUMENTS 7,287,111 B2  10/2007  Hur
9,720,601 B2   8/2017  Gupta et al.

OTHER PUBLICATIONS

Posted by Margaret Rouse, read-intensive SSD (read-intensive solid-state drive), http://searchstorage.techtarget.com/definition/read-intensive-SSD-read-intensive-solid-state-drive.
P. G. Harrison et al., Storage Workload Modelling by Hidden Markov Models: Application to FLASH Memory, Sep. 14, 2012.

*Primary Examiner* — David Yi
*Assistant Examiner* — Zubair Ahmed
(74) *Attorney, Agent, or Firm* — IP & T Group LLP

(57) ABSTRACT

Systems and methods are provided for predicting commands. A controller of a memory system includes a receiver for sequentially receiving a plurality of commands for the memory device in a plurality of windows, and a control component including a finite state machine for training multiple groups of states based on characteristics of the plurality of windows, and predicting a characteristic of next commands, which is to be received in a next window subsequent to a last window among the plurality of windows, based on the multiple groups of states.

20 Claims, 38 Drawing Sheets

FIG. 18

| State W1 | State W2 | State W3 | State W4 |
|---|---|---|---|
| Write Type : 1<br>Read Type : 0<br>Undefined : 0 | Write Type : 1<br>Read Type : 0<br>Undefined : 0 | Write Type : 0<br>Read Type : 1<br>Undefined : 0 | Write Type : 0<br>Read Type : 0<br>Undefined : 0 |
| State R1 | State R2 | State R3 | State R4 |
| Write Type : 0<br>Read Type : 1<br>Undefined : 0 | Write Type : 0<br>Read Type : 0<br>Undefined : 0 | Write Type : 0<br>Read Type : 0<br>Undefined : 0 | Write Type : 0<br>Read Type : 0<br>Undefined : 0 |

FIG. 22

| State W1           | State W2           | State W3           | State W4           |
|--------------------|--------------------|--------------------|--------------------|
| Write Type : 2     | Write Type : 1     | Write Type : 0     | Write Type : 0     |
| Read Type : 0      | Read Type : 1      | Read Type : 1      | Read Type : 0      |
| Undefined : 0      | Undefined : 0      | Undefined : 0      | Undefined : 0      |
| State R1           | State R2           | State R3           | State R4           |
| Write Type : 0     | Write Type : 1     | Write Type : 0     | Write Type : 0     |
| Read Type : 1      | Read Type : 0      | Read Type : 0      | Read Type : 0      |
| Undefined : 0      | Undefined : 0      | Undefined : 0      | Undefined : 0      |

FIG. 25

| State W1 | State W2 | State W3 | State W4 |
|---|---|---|---|
| Write Type : 2 | Write Type : 1 | Write Type : 0 | Write Type : 0 |
| Read Type : 0 | Read Type : 1 | Read Type : 1 | Read Type : 0 |
| Undefined : 0 | Undefined : 0 | Undefined : 0 | Undefined : 0 |
| State R1 | State R2 | State R3 | State R4 |
| Write Type : 0 | Write Type : 1 | Write Type : 0 | Write Type : 0 |
| Read Type : 1 | Read Type : 0 | Read Type : 0 | Read Type : 0 |
| Undefined : 1 | Undefined : 0 | Undefined : 0 | Undefined : 0 |

FIG. 27A

```
State W1
Write Type : 640
Read Type : 3
Undefined : 15
```

FIG. 27B

```
State W3
Write Type : 4
Read Type : 500
Undefined : 1
```

FIG. 27C

```
State R2
Write Type : 258
Read Type : 243
Undefined : 1
```

FIG. 27D

State R3
Write Type : 3
Read Type : 250
Undefined : 0

FIG. 27E

Current state
↓
State W100
Write Type : 21
Read Type : 1
Undefined : 0

US 10,802,761 B2

WORKLOAD PREDICTION IN MEMORY SYSTEM AND METHOD THEREOF

CROSS-REFERENCE TO RELATED APPLICATION

This application claims the benefit of U.S. Provisional Application No. 62/648,757, filed on Mar. 27, 2018, the entire contents of which are incorporated herein by reference.

BACKGROUND

1. Field

Embodiments of the present disclosure relate to a scheme for processing commands in a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs). Memory systems use various system data.

SUMMARY

Aspects of the present invention include a memory system for predicting of commands and a method thereof.

In one aspect, a memory system includes a memory device and a controller. The controller includes a receiver for sequentially receiving a plurality of commands for the memory device in a plurality of windows, and a control component including a finite state machine for training multiple groups of states based on characteristics of the plurality of windows, and predicting a characteristic of next commands, which is to be received in a next window subsequent to a last window among the plurality of windows, based on the multiple groups of states.

In another aspect, a method for operating a memory system including a memory device and a controller. The method includes: sequentially receiving a plurality of commands for the memory device in a plurality of windows; training multiple groups of states using a finite state machine, based on characteristics of the plurality of windows; and predicting a characteristic of next commands, which is to be received in a next window subsequent to a last window among the plurality of windows, based on the multiple groups of states.

Additional aspects of the present invention will become apparent from the following description.

BRIEF DESCRIPTION OF THE DRAWINGS

FIG. 12 to FIG. 25 illustrate state update operations of a finite state machine (FSM) in accordance with an embodiment of the present invention.

FIG. 27A to FIG. 27E illustrate operations for predicting a characteristic of next commands using a finite state machine (FSM) in accordance with an embodiment of the present invention.

DETAILED DESCRIPTION

Figure 1:
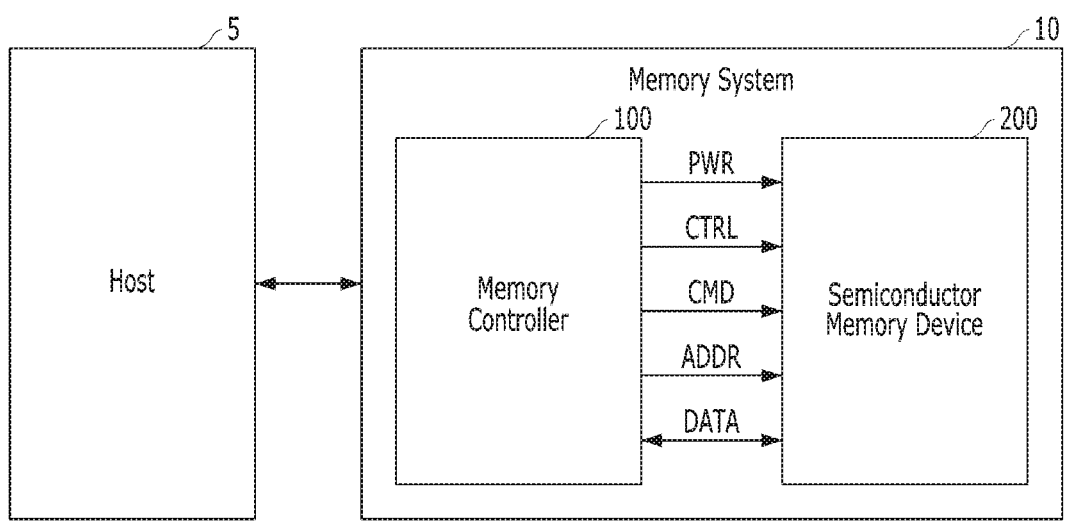
FIG. 1 is a block diagram illustrating a data processing system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any one of various kinds of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any one of various kinds of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFTD) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
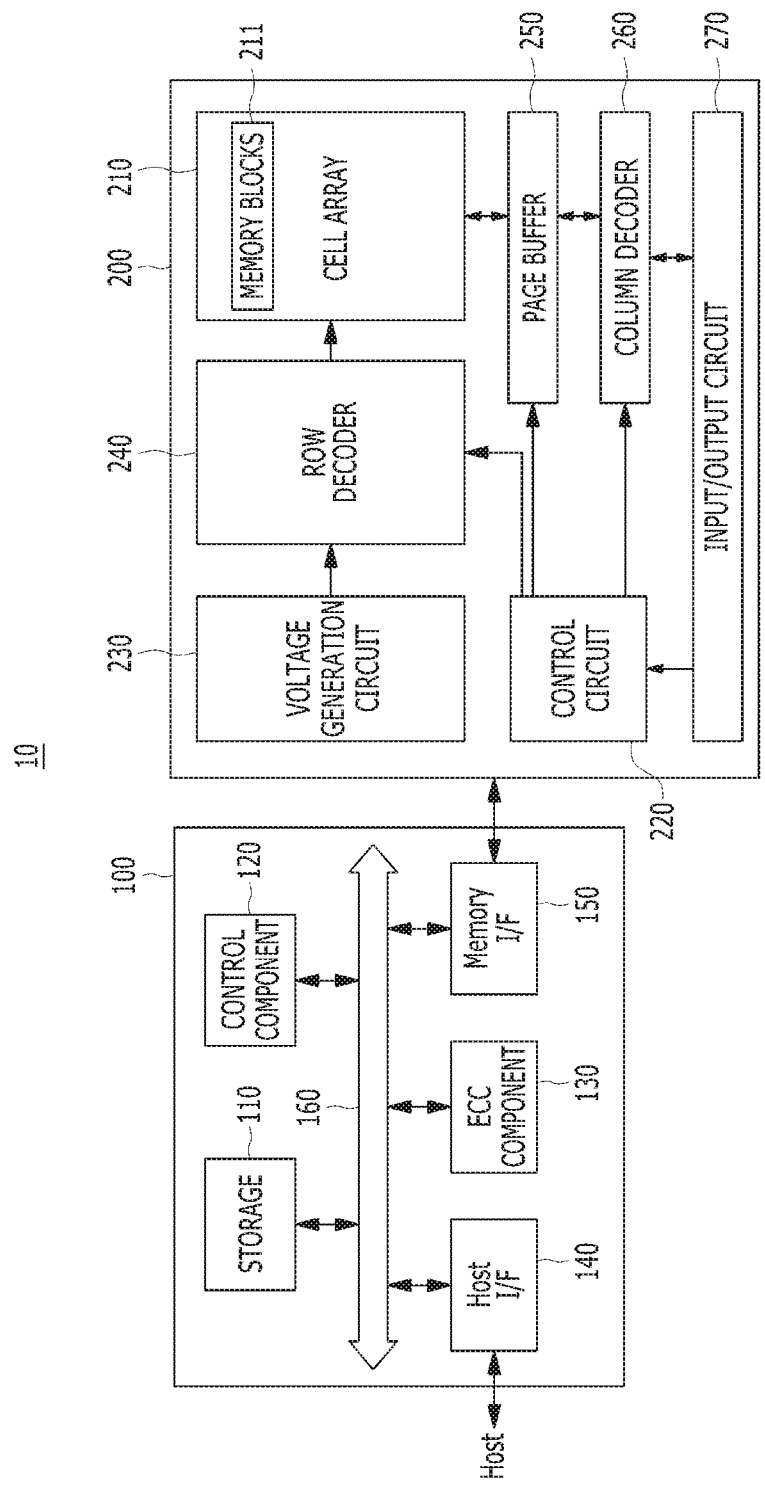
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
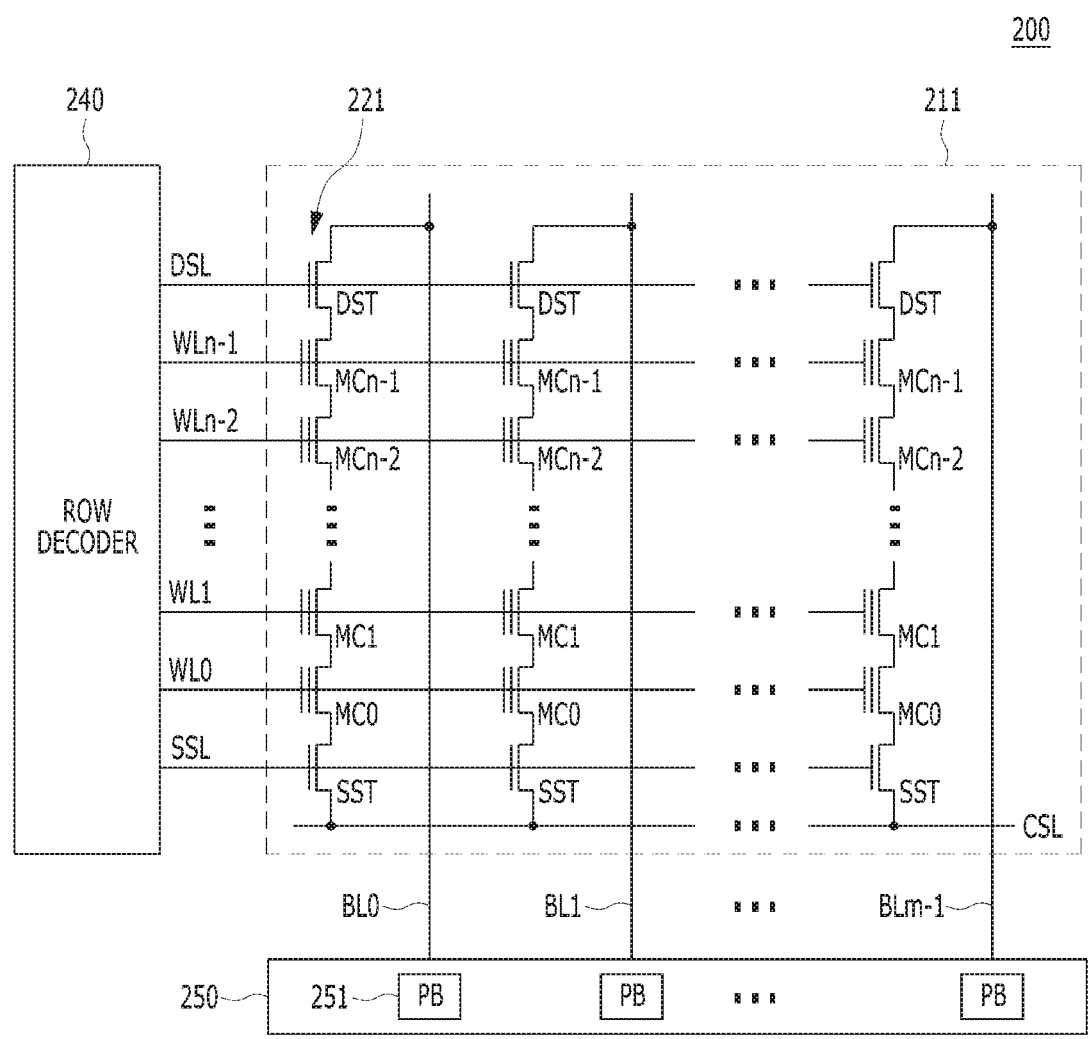
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 may temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4A:
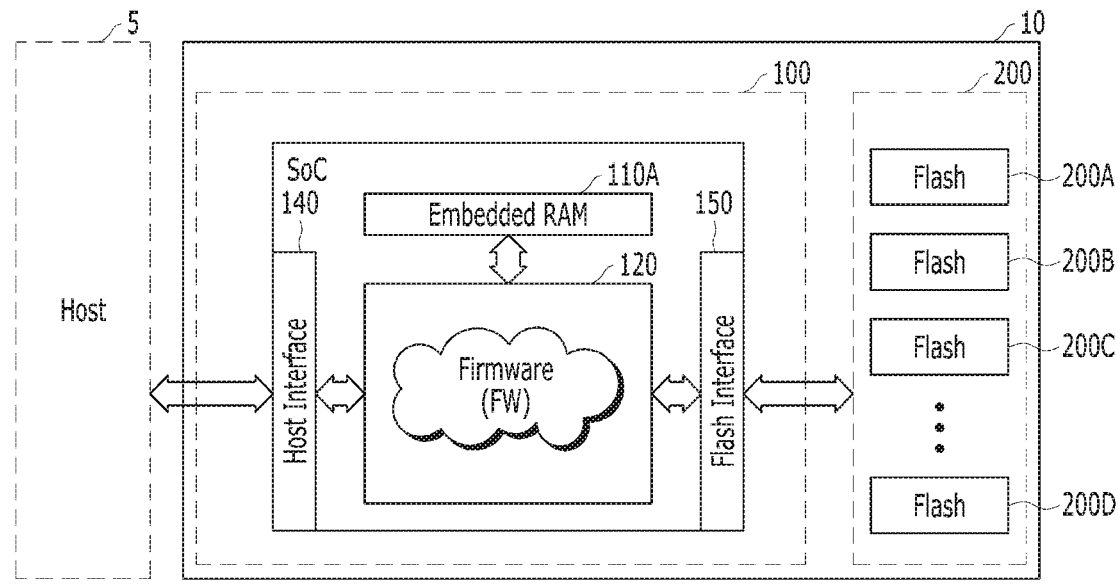
FIGS. 4A and 4B are diagrams illustrating a data processing system in accordance with an embodiment of the present invention.
Figure 4B:
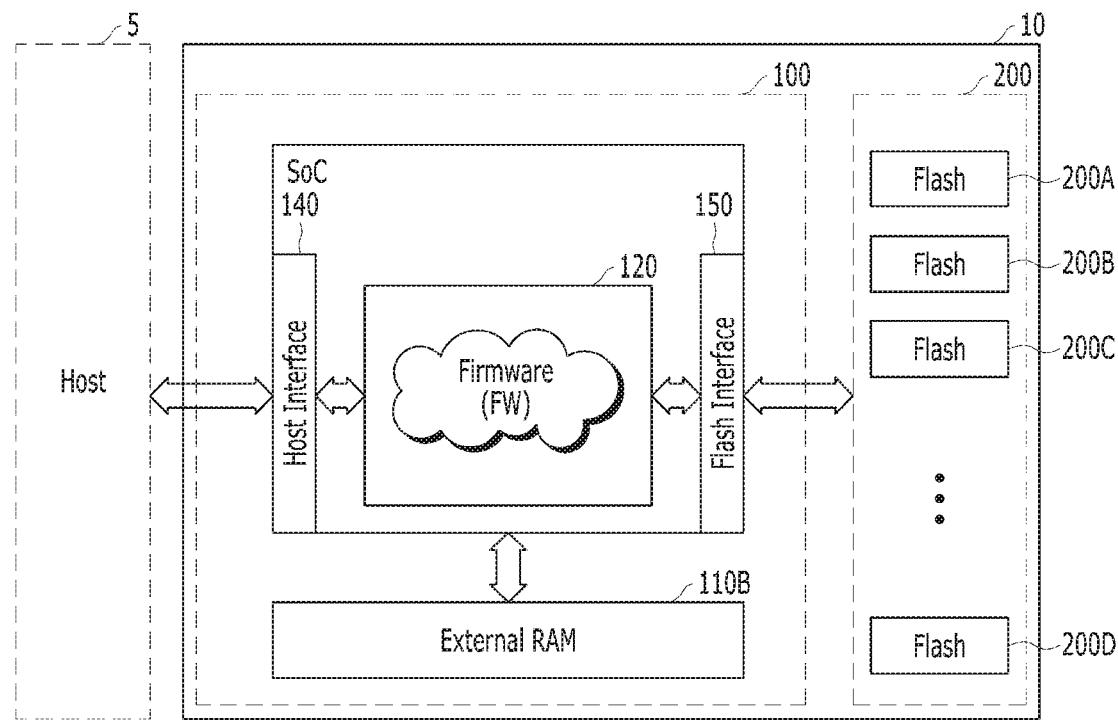

FIGS. 4A and 4B are diagrams illustrating a data processing system in accordance with an embodiment of the present invention.

Referring to FIG. 4A, the data processing system may include a host device 5 and a memory system 10. The memory system 10 may include a controller 100 and a memory device 200. In various embodiments, the memory system 10 may be a flash-based storage device such as a memory card of a universal flash storage (UFS) or a solid state drive (SSD).

The memory device 200 may include a plurality of flash chips 200A to 200D. In various embodiments, the plurality of flash chips 200A to 200D may be implemented with NAND flash chips. The controller 100 may include a storage 110A, a control component 120, a host interface 140 and a flash interface 150. The storage 110A, the control component 120, the host interface 140 and the flash interface 150 may be implemented with system-on-chip (SoC). The storage 110A may be implemented with an embedded random access memory (RAM). The control component 120 may be implemented with a microprocessor (μP). The control component 120 may include firmware (FW), which is usually running thereon. Further, the controller 100 may include other elements, which are illustrated in FIG. 2 but not illustrated in FIGS. 4A and 4B. The storage 110A, the control component 120, the host interface 140 and the flash interface 150 may be implemented on system-on-chip (SoC).

Referring to FIG. 4B, the data processing system may include a host device 5 and a memory system 10. As shown in FIG. 4A, the memory system 10 may include a controller 100 and a memory device 200.

The controller 100 may include a storage 110B, a control component 120, host interface 140 and flash interface 150. The control component 120, the host interface 140 and the flash interface 150 may be implemented on system-on-chip (SoC). The storage 110B may be implemented by an external random access memory (RAM). The control component 120 may be implemented with a microprocessor (μP). The control component 120 may include firmware (FW), which is usually running thereon. Further, the controller 100 may other include elements, which are illustrated in FIG. 2 but not illustrated in FIGS. 4A and 4B.

In various embodiments, the memory system 10 (e.g., NAND flash storage) may receive, from the host device 5, a plurality of commands (or a sequence of commands) for the memory device 200. The sequence of commands that the memory system 10 is getting from the host device 5 may be defined as workload(s). The host device 5 (e.g., user applications and file system) may generate similar workloads in a specific domain and for certain device usage patterns. The memory system 10 may work (or operate) with workloads, which have various characteristics. The workloads may be characterized as random or sequential, read intensive or write intensive. The workloads may have similar periodic behavior, By knowing characteristics of commands, the memory system 10 may change the corresponding firmware (FW) strategies or parameters to improve the write amplification, performance, and lifetime.

Embodiments of the present disclosure describe a scheme to characterize the workload for a current window of commands and predict workload characteristics for the next window of commands using limited resources (e.g., CPU and RAM resources) to make the prediction. The scheme may use a finite state machine (FSM), which is dynamically composed.

Figure 5:
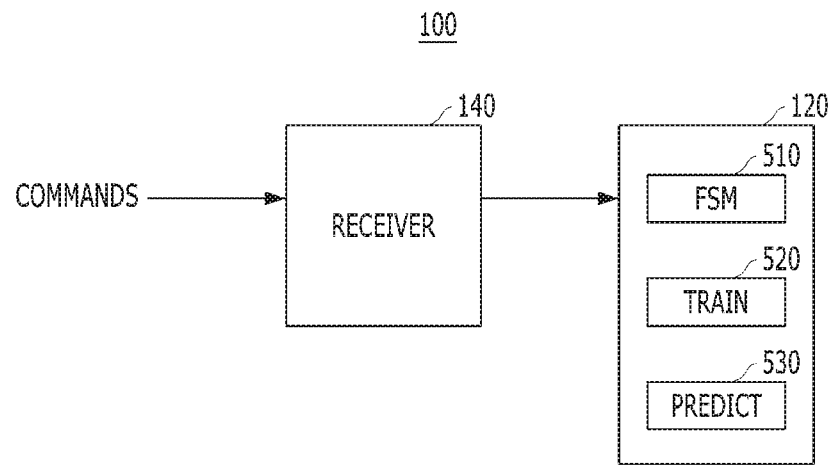
FIG. 5 is a diagram illustrating a memory controller in accordance with an embodiment of the present invention.

FIG. 5 is a diagram illustrating a memory controller 100 in accordance with an embodiment of the present invention.

Referring to FIG. 5, the memory controller 100 may include a control component 120 and a receiver 140. The control component 120 and the receiver 140 may correspond to the control component 120 and the host interface 140 of FIGS. 2 and 4, respectively. In various embodiments, the control component 120 may include a finite state machine (FSM) 510, a training module 520 and a predicting module 530. Further, the controller 100 may other include elements, which are illustrated in FIG. 2 but not illustrated in FIG. 5.

The receiver 140 may sequentially receive a plurality of commands for a memory device (e.g., the memory device 200 of FIGS. 1 to 4) in a plurality of windows. For example, the plurality of commands may be received from a host device (e.g., the host device 5 of FIGS. 1, 4A and 4B).

The finite state machine 510 may include multiple groups of states. The training module 520 may train the multiple groups of states based on characteristics of the plurality of windows. The predicting module 530 may predict a characteristic of next commands, which are to be received in a next window subsequent to a last window among the plurality of windows, based on the multiple groups of states.

In various embodiments, the training module 520 of the control component 120 may determine a characteristic of each of the plurality of windows, and update the multiple groups of states based on the determined characteristics.

In various embodiments, the multiple groups of states correspond to types of the plurality of commands.

In various embodiments, the plurality of commands includes a read command and a write command.

In various embodiments, the characteristic indicates which type of commands are more included, among the plurality of commands in each of the plurality of windows.

In various embodiments, each of the multiple groups of states includes a plurality of counters.

In various embodiments, the number of the plurality of counters corresponds to the number of types of the plurality of commands.

In various embodiments, the training module 520 of the control component 120 may select a corresponding group among the multiple groups of states based on the determined characteristic. The training module 520 may increase a value of a corresponding counter for a current state of the selected group based on the determined characteristic.

In various embodiments, the training module 520 of the control component 120 may determine, as the current state, a next state, which is to be next to a corresponding state of a previously selected group, when the selected group is identical to the previously selected group. The training module 520 of the control component 120 may determine, as the current state, an initial state of the previously selected group when the selected group is different from the previously selected group.

In various embodiments, the training module 520 of the control component 120 may analyze the characteristics of the plurality of windows based on the current state, values of counters included in the current state. The predicting module 530 of the control component 120 may predict the characteristic of the next commands based on the analyzed characteristic of the previous window.

Figure 6:
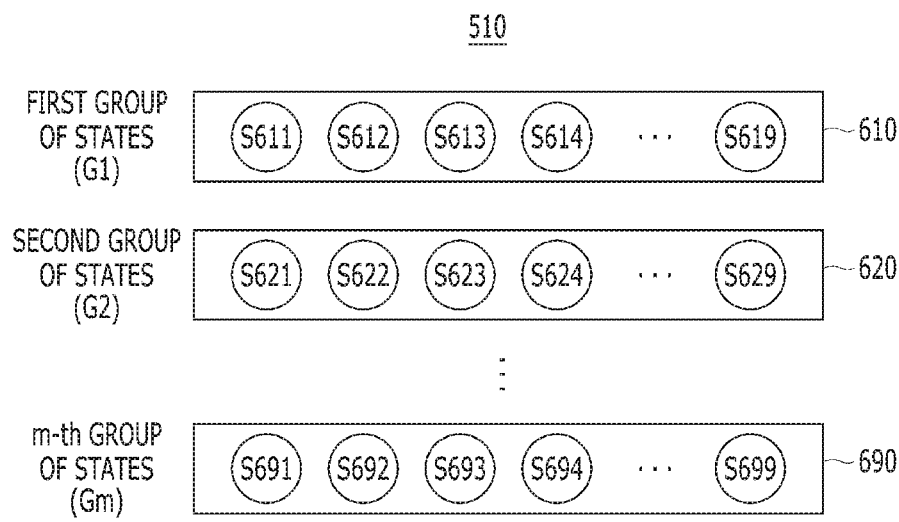
FIG. 6 is a diagram illustrating groups of states of a finite state machine (FSM) in accordance with an embodiment of the present invention.

FIG. 6 is a diagram illustrating groups of states of a finite state machine (FSM) 510 in accordance with an embodiment of the present invention.

Referring to FIG. 6, the FSM 510 may include multiple groups of states 610 to 690. A first group G1 of states 610 may include a plurality of individual states S611 to S619. A second group G2 of states 620 may include a plurality of individual states S621 to S629. An m-th group Gm of states 690 may include a plurality of individual states S691 to S699.

In various embodiments, the multiple groups of states 610 to 690 may correspond to types of a plurality of commands. The plurality of commands may include a read command and a write command.

In various embodiments, each of the multiple groups of states 610 to 690 may include a plurality of counters. The number of the plurality of counters may correspond to the number of types of the plurality of commands.

In various embodiments, the characteristic indicates which type of commands are more included, among the plurality of commands in each of a plurality of windows.

Figure 7A:
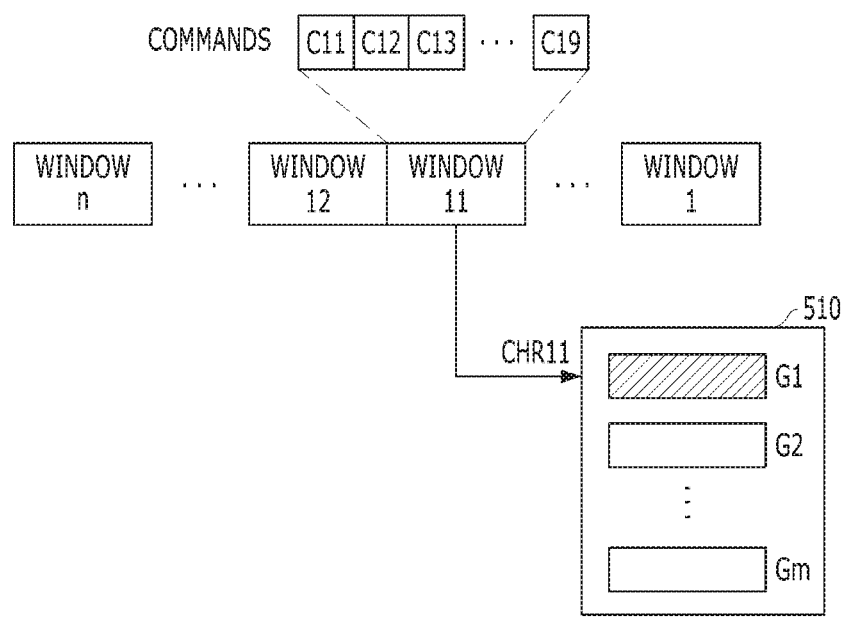
FIGS. 7A to 7C are diagrams illustrating examples of an operation for selecting a group among multiple groups of states in a window in accordance with an embodiment of the present invention.
Figure 7B:
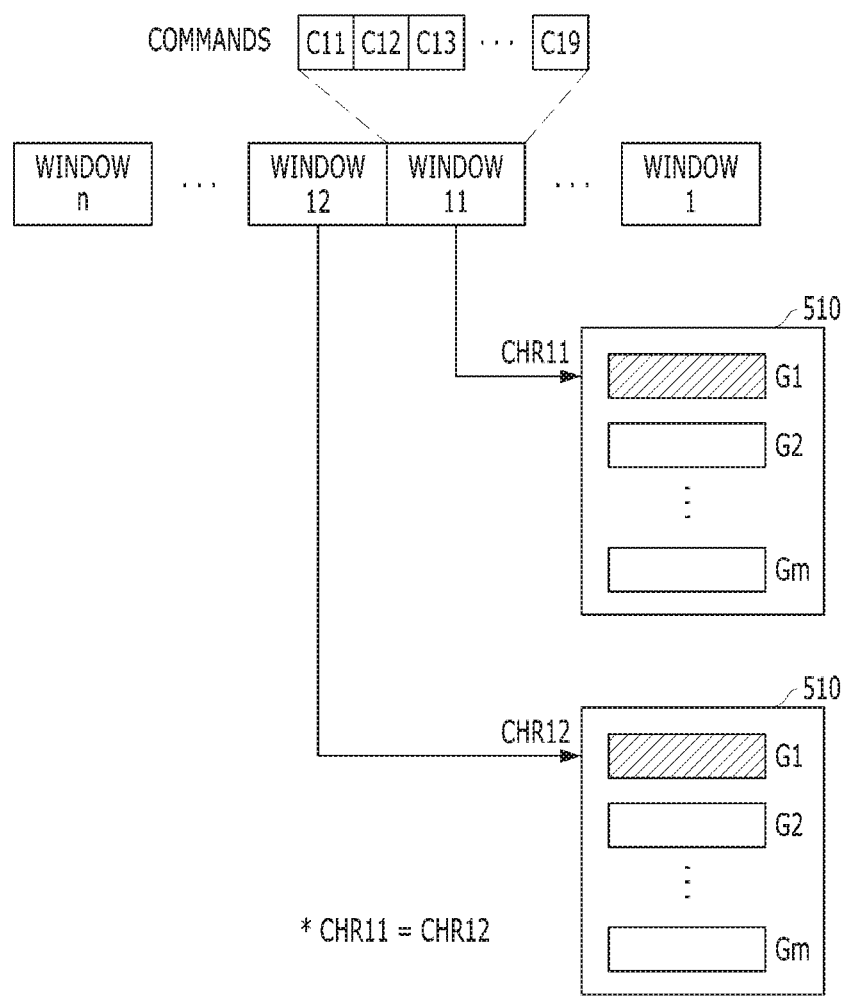
Figure 7C:
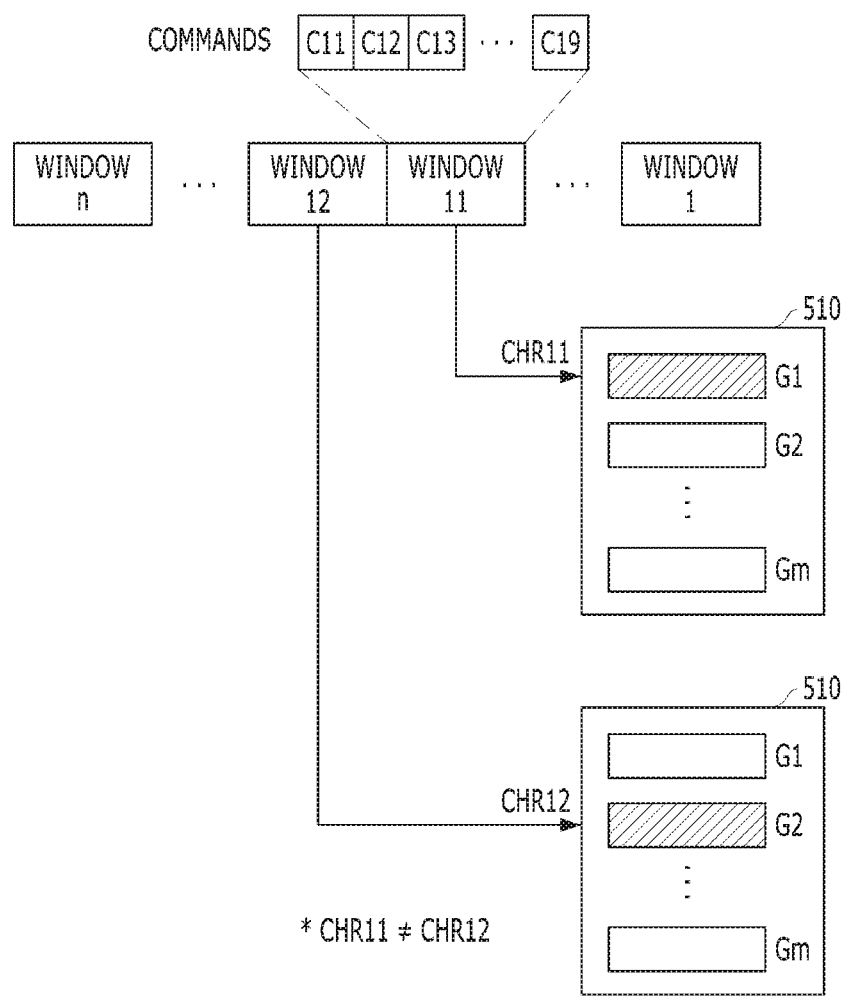

FIGS. 7A to 7C are diagrams illustrating examples of an operation for selecting a group among multiple groups of states in a window in accordance with an embodiment of the present invention. Operations of FIGS. 7A to 7C may be performed by the control component 120 in FIG. 5.

Referring to FIG. 7A, the control component 120 may receive, from the receiver 140, a plurality of commands in each of a plurality of windows WINDOW1 to WINDOWn. Each of the plurality of windows WINDOW1 to WINDOWn may represent a sequence of commands with a certain length (e.g., 10 megabytes (MB)). The windows may be sequential in time, i.e., WINDOW1 is first in time and WINDOWn is last in time. The receiver 140 may receive the plurality of commands from the host device 5 of FIGS. 4A and 4B. By way of example, in a window WINDOW11, the control component 120 may receive a plurality of commands C11 to C19.

The training module 520 may determine a characteristic CHR11 of the plurality of commands C11 to C19 in the window WINDOW11. For example, the characteristic CHR11 may indicate which type of commands is predominate (or intensive) among the plurality of commands C11 to C19. When there are more write commands than each of the other types of commands by a certain margin, e.g. greater than 10% in the window WINDOW11, the characteristic CHR11 may be determined as "Write Intensive". When there are more read commands than each of the other types of commands by a certain margin, e.g., greater than 10% in the window WINDOW11, the characteristic CHR11 may be determined as "Read Intensive".

The training module 520 may update multiple groups of states G1 to Gm included in the finite state machine 510 based on the determined characteristic CHR11. In other words, the training module 520 may select a corresponding group among the multiple groups of states G1 to Gm based on the determined characteristic CHR11. When a group G1 corresponds to the determined characteristic CHR11, the training module 520 may select the group G1 among the multiple groups of states G1 to Gm. For example, the group G1 may be a write-related group corresponding to the determined characteristic CHR11 (e.g., "Write Intensive").

Referring to FIG. 7B, the control component 120 may receive, from the receiver 140, a plurality of commands in a window WINDOW12 subsequent to the window WINDOW11.

The training module 520 may determine a characteristic CHR12 of a plurality of commands in the window WINDOW1.2. The characteristic CHR12 may indicate which type of commands is predominate (or intensive) in the plurality of commands C11 to C19. For example, when there are more write commands in the window WINDOW12 by a certain margin relative to each of the other types of commands, the characteristic CHR12 may be determined as "Write Intensive".

The training module 520 may update multiple groups of states G1 to Gm included in the finite state machine 510 based on the determined characteristic CHR12. In other words, the training module 520 may select a corresponding group among the multiple groups of states G1 to Gm based on the determined characteristic CHR12. When the group G1 corresponds to the determined characteristic CHR12, the training module 520 may select the group G1 among the multiple groups of states G1 to Gm. For example, the group G1 may be a write-related group corresponding to the determined characteristic CHR12 (e.g., "Write Intensive").

As such, when the characteristic CHR11 of the window WINDOW11 is identical to the characteristic CHR12 of the window WINDOW12, the group G1 may be selected, as the same as the selection shown in FIG. 7A.

Referring to FIG. 7C, the control component 120 may receive, from the receiver 140, a plurality of commands in a window WINDOW12 subsequent to the window WINDOW11.

The training module 520 may determine a characteristic CHR12 of a plurality of commands in the window WINDOW12. The characteristic CHR12 may indicate which type of commands is predominate (or intensive) in the plurality of commands C11 to C19. For example, when there are more read commands in the window WINDOW12 by a certain margin relative to each of the other types of commands, the characteristic CHR12 may be determined as "Read Intensive".

The training module 520 may update multiple groups of states G1 to Gm included in the finite state machine 510 based on the determined characteristic CHR12. In other words, the training module 520 may select a corresponding group among the multiple groups of states G1 to Gm based on the determined characteristic CHR12. When the group G2 corresponds to the determined characteristic CHR12, the training module 520 may select the group G2 among the multiple groups of states G1 to Gm. For example, the group G2 may be a read-related group corresponding to the determined characteristic CHR12 (e.g., "Read Intensive").

As such, when the characteristic CHR11 of the window WINDOW11 is different from the characteristic CHR12 of the window WINDOW12, the group G2 may be selected, as different from the selection as shown in FIG. 7A.

Figure 8:
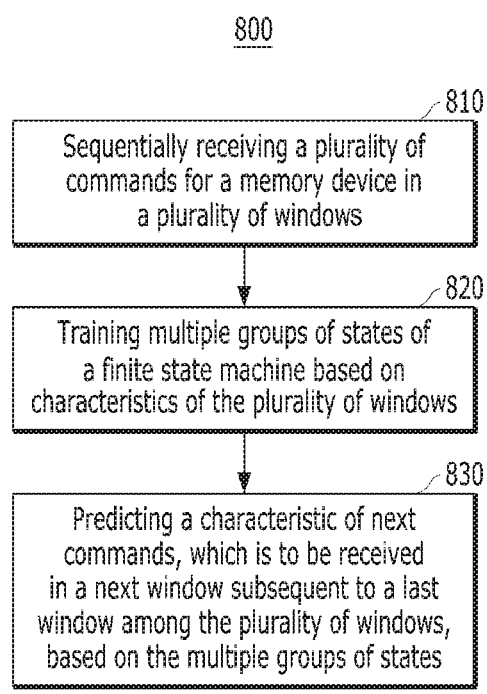
FIG. 8 is a flowchart illustrating an operation of a memory controller in accordance with an embodiment of the present invention.

FIG. 8 is a flowchart illustrating an operation 800 of a memory controller in accordance with an embodiment of the present invention. The operation of FIG. 8 may be performed by the receiver 140 and the control component 120 of the memory controller 100 in FIG. 5.

Referring to FIG. 8, the operation 800 may include steps 810, 820 and 830. At step 810, the receiver 140 may sequentially receive a plurality of commands for a memory device (e.g., the memory device 200 of FIGS. 1 to 4B) in a plurality of window.

At step 820, the training module 520 of the control component 120 may train multiple groups of states included in the finite state machine 510, based on characteristics of the plurality of windows.

At step 830, the predicting module 530 of the control component 120 may predict a characteristic of next commands, which is to be received in a next window (e.g., WINDOW12 of FIGS. 7A to 7C) subsequent to a last window (e.g., WINDOW11 of FIGS. 7A to 7C) among the plurality of windows (e.g., WINDOW1 to WINDOW11 of FIGS. 7A to 7C), based on the multiple groups of states.

In various embodiments, the step 820 may include determining a characteristic of each of the plurality of windows; and updating the multiple groups of states based on the determined characteristic.

In various embodiments, the multiple groups of states may correspond to types of the plurality of commands. The plurality of commands includes a read command and a write command.

In various embodiments, the characteristic may indicate which type of commands is predominate, among the plurality of commands in each of the plurality of windows.

In various embodiments, each of the multiple groups of states may include a plurality of counters. The number of the plurality of counters may correspond to the number of types of the plurality of commands.

In various embodiments, at step 820, the updating of the multiple groups of states may include selecting a corresponding group among the multiple groups of states based on the determined characteristic, and increasing a value of a corresponding counter for a current state of the selected group based on the determined characteristic.

In various embodiments, the step 820 may further include determining, as the current state, a state next to a corresponding state of a previously selected group when the selected group is identical to a previously selected group. The step 820 may further include determining, as the current state, an initial state of the previously selected group when the selected group is different from the previously selected group.

In various embodiments, at the step 820, the determining of the characteristic of each of the plurality of windows may include analyzing the characteristics of the plurality of windows based on the current state, values of counters included in the current state.

In various embodiments, the step 830 may include predicting the characteristic of the next commands based on the analyzed characteristic of the previous window.

Figure 9:
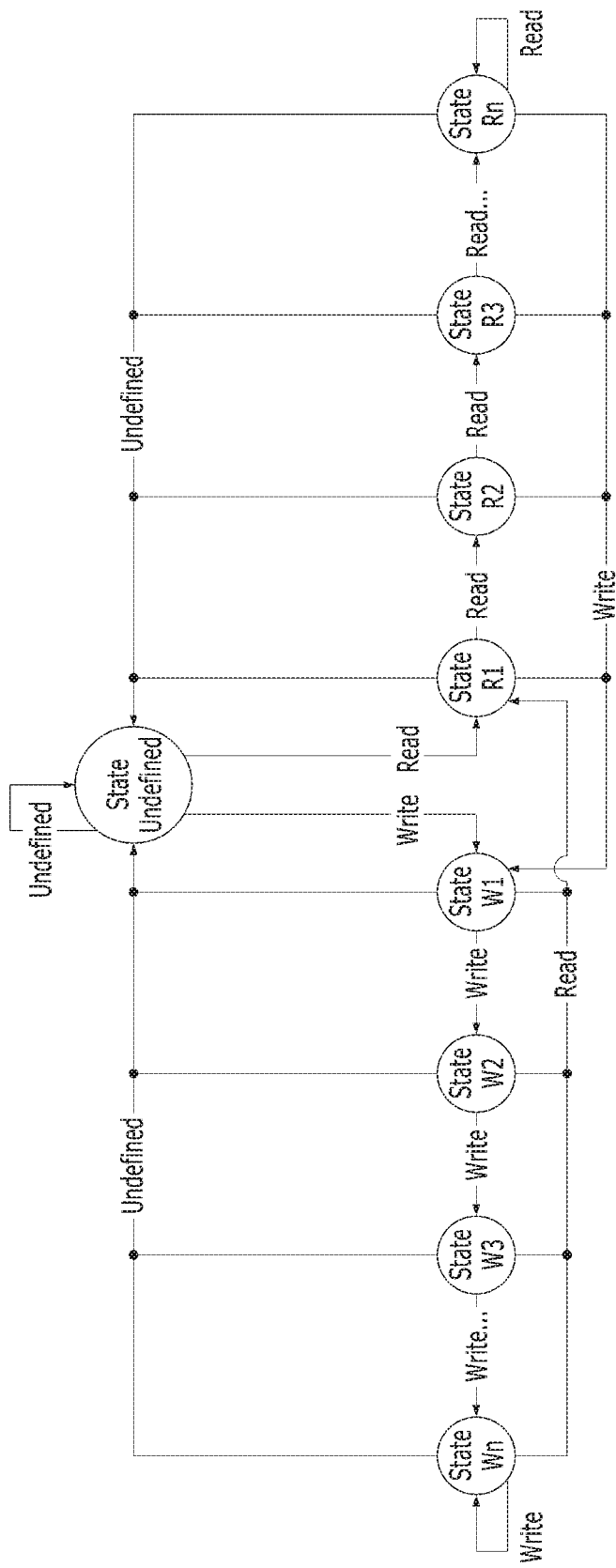
FIG. 9 is a diagram illustrating multiple groups of states of a finite state machine (FSM) in accordance with an embodiment of the present invention.

FIG. 9 is a diagram illustrating multiple groups of states of a finite state machine (FSM) (e.g., the FSM 510 of FIG. 5) in accordance with an embodiment of the present invention.

Referring to FIG. 9, the FSM may include a plurality of states. By way of example, for the characterization of workload (i.e., a sequence of commands), the plurality of states may include 3 groups of states. Alternatively, as the number of characterizations of workload increases, the number of the groups of states may increase.

A first group of states may include a state of Undefined. A second group of states may include a write group of states W1 to Wn. A third group of states may include a read group of states R1 to Rn. In various embodiments, the second group of states may be selected and updated in response to characterization of a workload as write intensive. In various embodiments, the third group of states may be selected and updated in response to characterization of a workload as read intensive.

Figure 10:
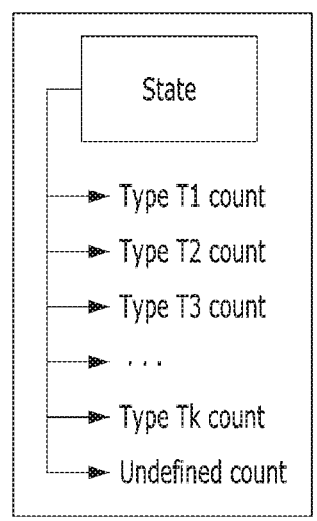
FIG. 10 is a diagram illustrating counters for each state of multiple groups of states of a finite state machine (FSM) in accordance with an embodiment of the present invention.

FIG. 10 is a diagram illustrating counters for each state of multiple groups of states of a finite state machine (FSM) (e.g., the FSM 510 of FIG. 5) in accordance with an embodiment of the present invention.

Referring to FIG. 10, a state may include a plurality of counters. The plurality of counters may include k counters for k types of commands respectively, and a counter for undefined state. The n counters may include a counter for type T1, a counter for type T2, a counter for type T3, and a counter for type Tk. In various embodiments, the number of counters may correspond to the number of types of commands. For example, when there are two types of commands, e.g., a write command and a read command, there may be three counters: a counter for a write type of command, a counter for a read type of command, and a counter for the undefined state. In other words, based on the number of the types of commands for the characterization, the number of the plurality of counters may be determined.

As described above in FIGS. 9 and 10, in order to predict workload characteristics for commands in the next window, the FSM including multiple groups of states is used. Each state of the FSM describes how much data (e.g., data in kilobytes (KB)) it takes for the memory system to handle the data with the target characteristics. After the memory system has gathered commands (or data) for the next window, these commands are analyzed and the current state may move to another state. As the analysis results, there may be three possible cases.

Case 1:

Commands (or data) in the current window still have the same target characteristic as commands of the previous window. In this case, the corresponding counter of the current state of FSM is increased and the current state is changed (or transitioned) to the next state with the same target characteristic. For example, when it is determined that the previous and current windows have the characteristics "Write Intensive", the corresponding counter of the state W1 is increased and the state W1 is changed to the state W2.

Case 2:

Commands (or data) in the current window have the different target characteristic as commands of the previous window. In other words, the target characteristic was changed. In this case, the corresponding counter of the current state of FSM is increased and the current state is changed (or transitioned) to the first state of the corresponding group with the corresponding target characteristic. For example, when it is determined that the previous window has the characteristic "Write Intensive" and the current window has the characteristic "Read Intensive", the corresponding counter of the state W1 is increased and the state W1 is changed to the state R1.

Case 3:

The target characteristic of commands (or data) in the current window is undefined. In this case, the corresponding counter of the current state of FSM is increased and the current state is changed (or transitioned) to the undefined state. For example, when it is determined that the previous window has the characteristic "Write Intensive" and the current window has the characteristic of "Write Intensive" (e.g., 55%) and "Read Intensive" (e.g., 45%), the corresponding counter of the state W1 is increased and the state W1 is changed to the state Undefined.

Figure 11:
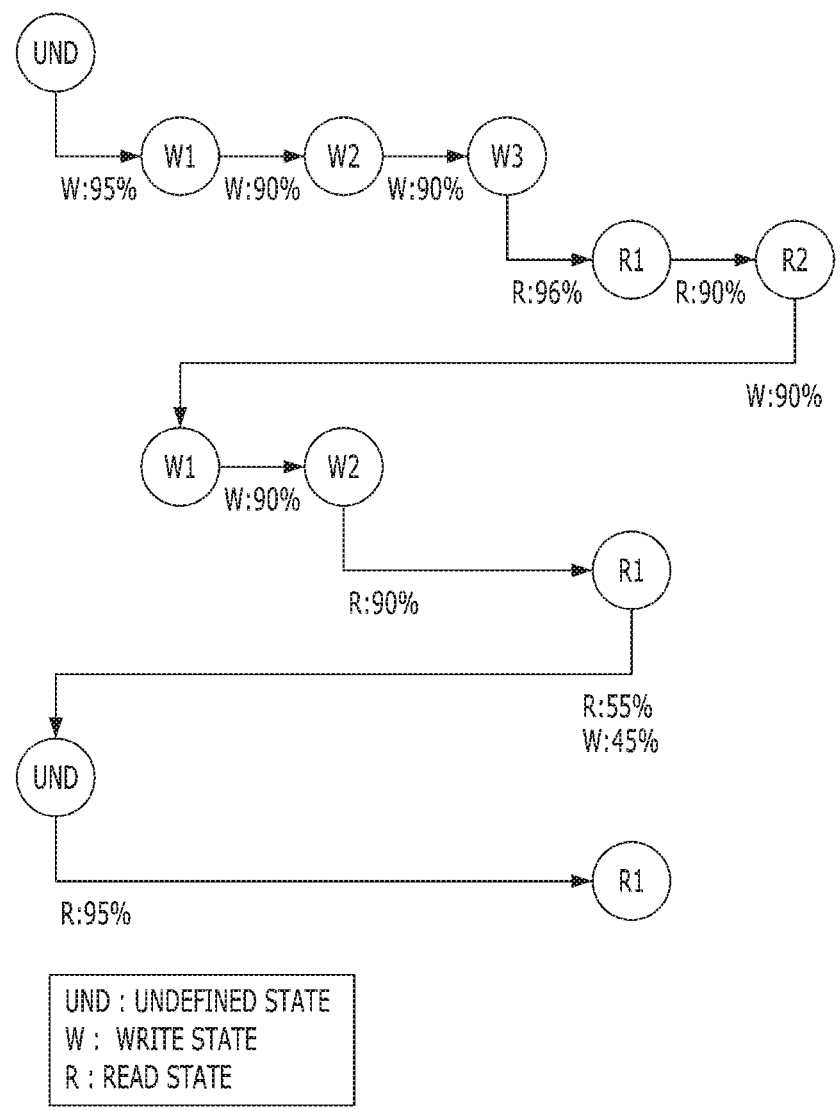
FIG. 11 is a diagram illustrating an operation for training states of a finite state machine (FSM) in accordance with an embodiment of the present invention.

FIG. 11 is a diagram illustrating an operation for training states of a finite state machine (FSM) (e.g., the FSM 510 of FIG. 5) in accordance with an embodiment of the present invention. The operation of FIG. 11 may be performed by the control component 120 of FIG. 5.

Referring to FIG. 11, in a plurality of windows, states may be trained (or updated) based on the characteristics of the current window. In various embodiments, the sizes of the windows may be 10 MB. Alternatively, the sizes of the windows may be different from each other.

In each of the plurality of windows, the characteristic of commands is determined, and then the current state is transitioned to the corresponding state. The selection and update operations of states in FIG. 11 will be described below with reference to FIG. 12 to FIG. 25. The operations of FIGS. 12 to 25 may be performed by the control component 120 of FIG. 5.

Figure 12:
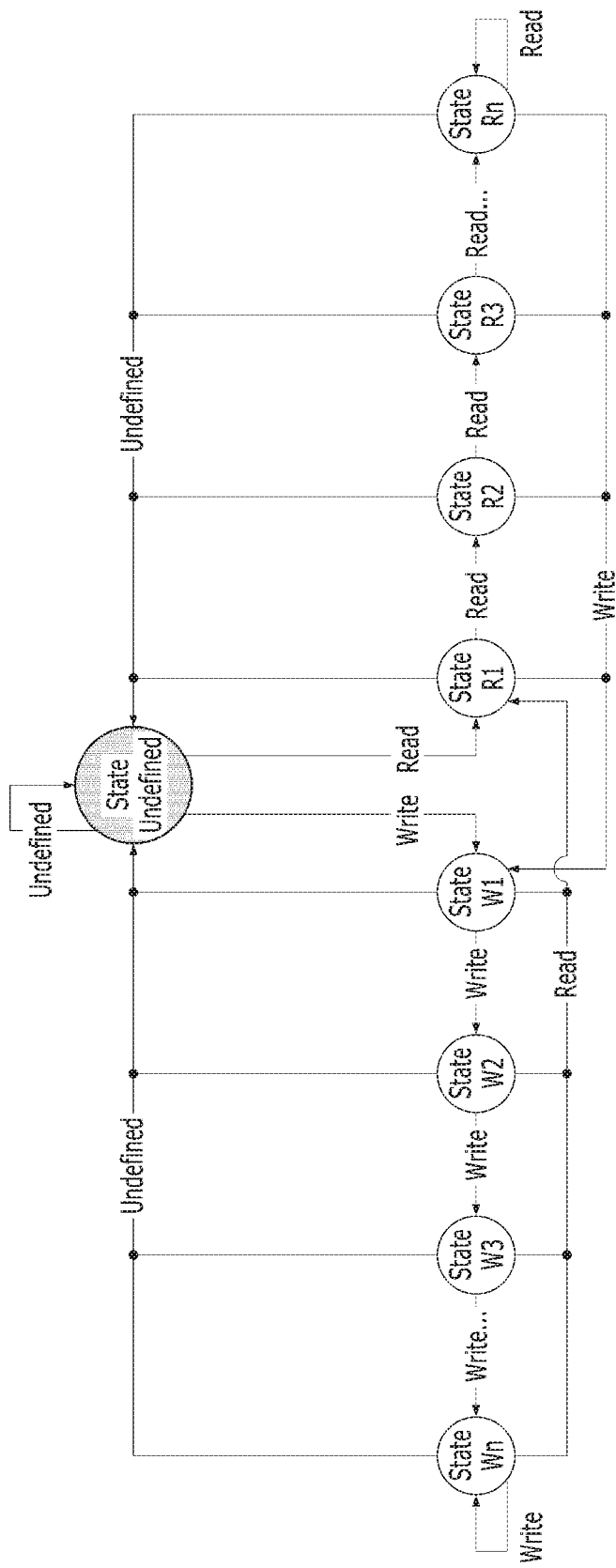
Figure 13A:
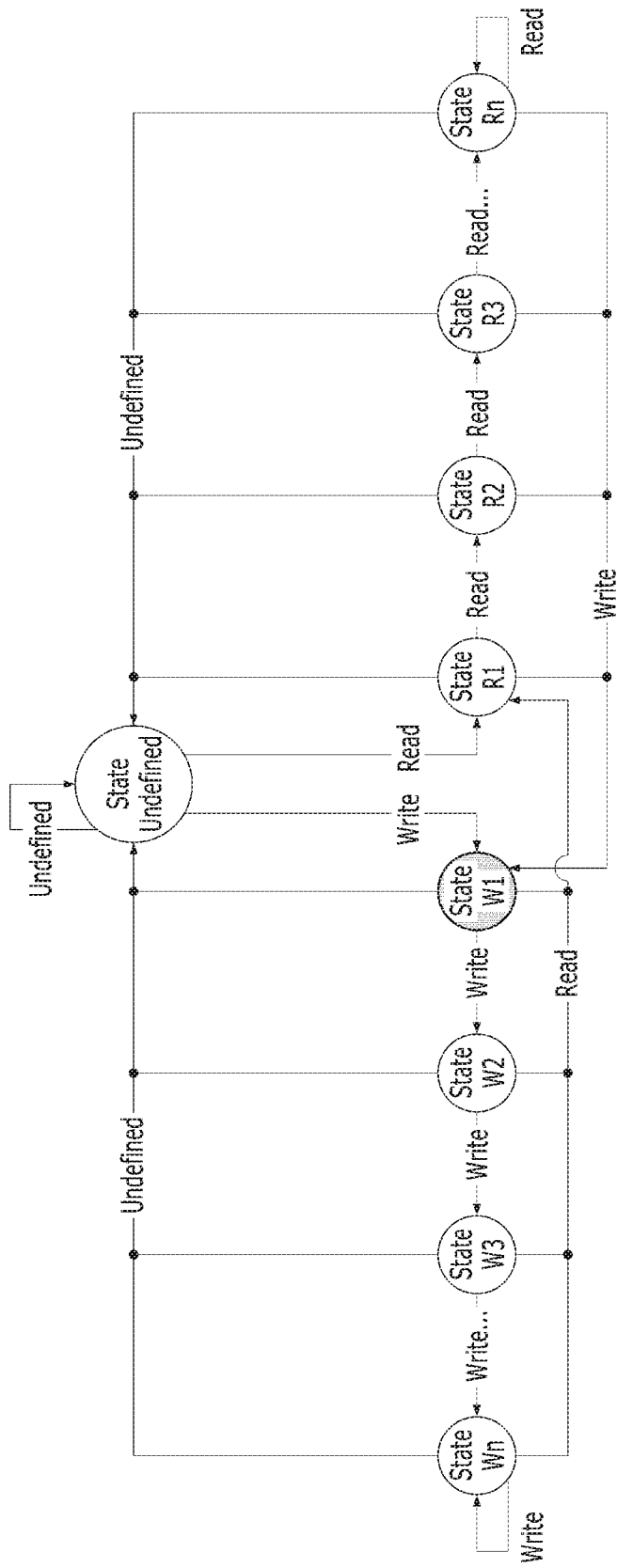
Figure 13B:
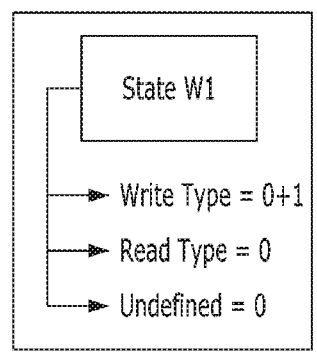
Figure 14A:
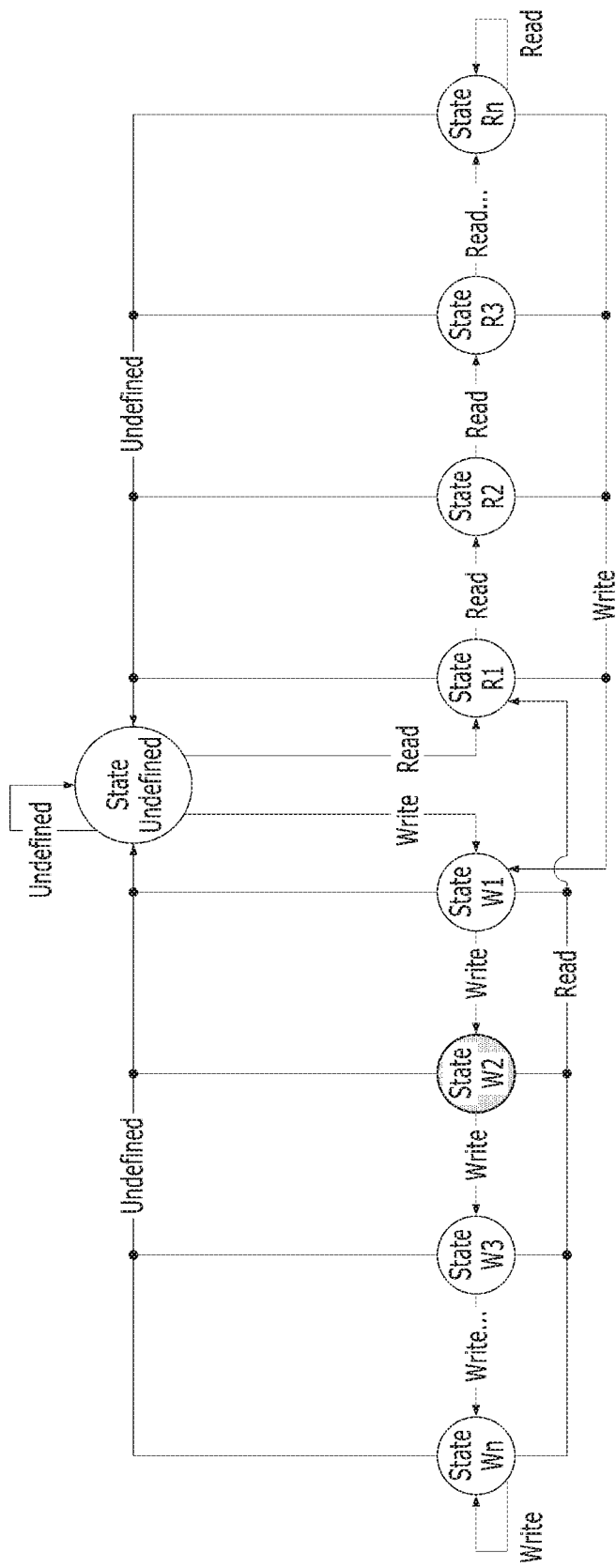
Figure 14B:
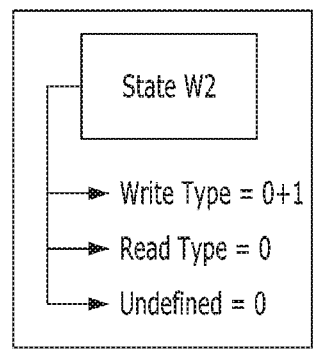
Figure 15A:
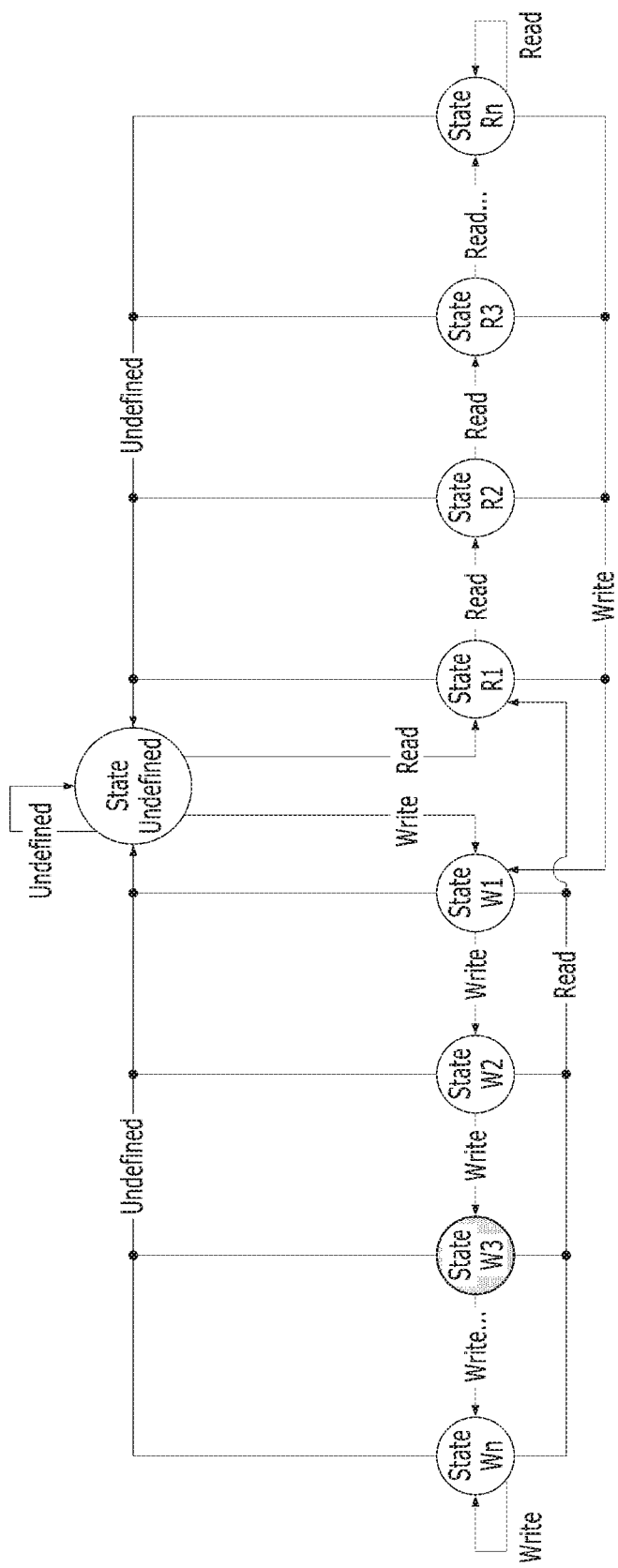
Figure 15B:
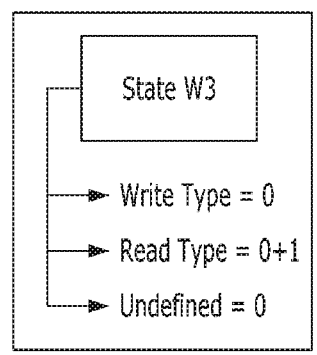
Figure 16A:
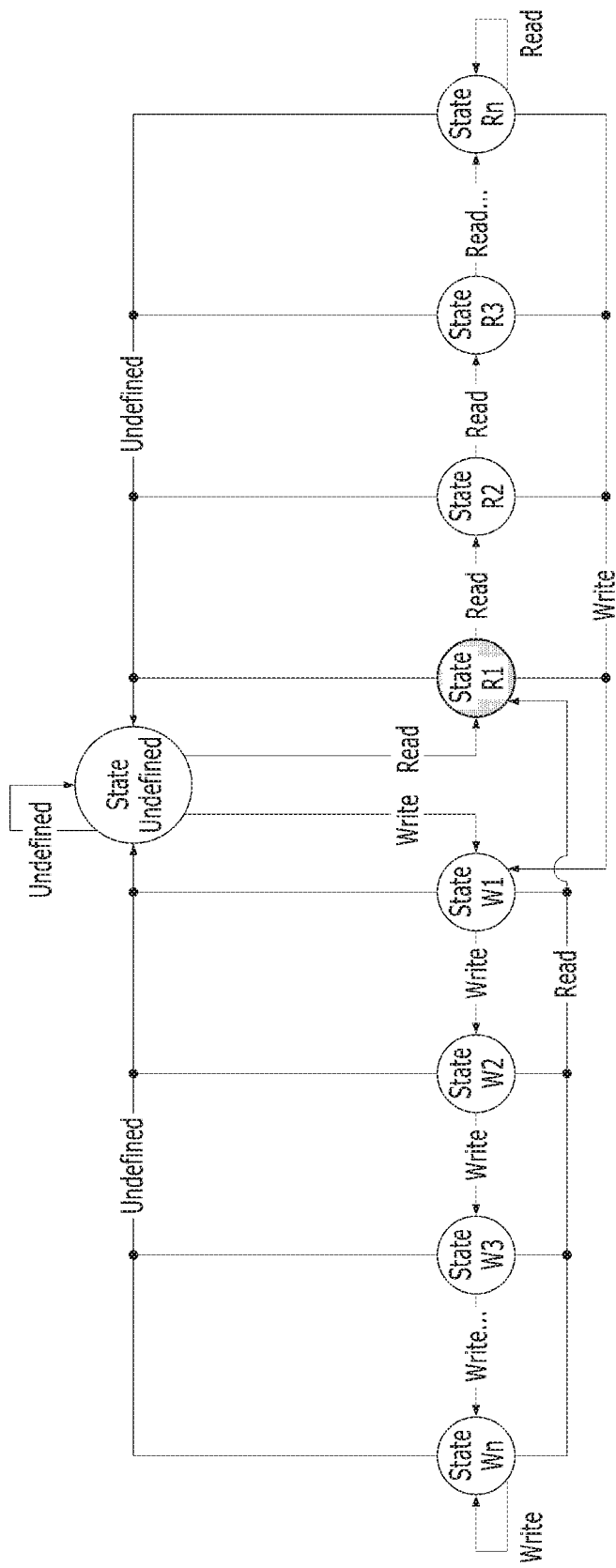
Figure 16B:
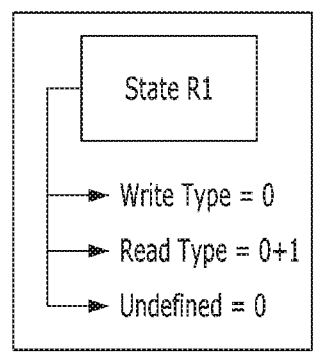
Figure 17A:
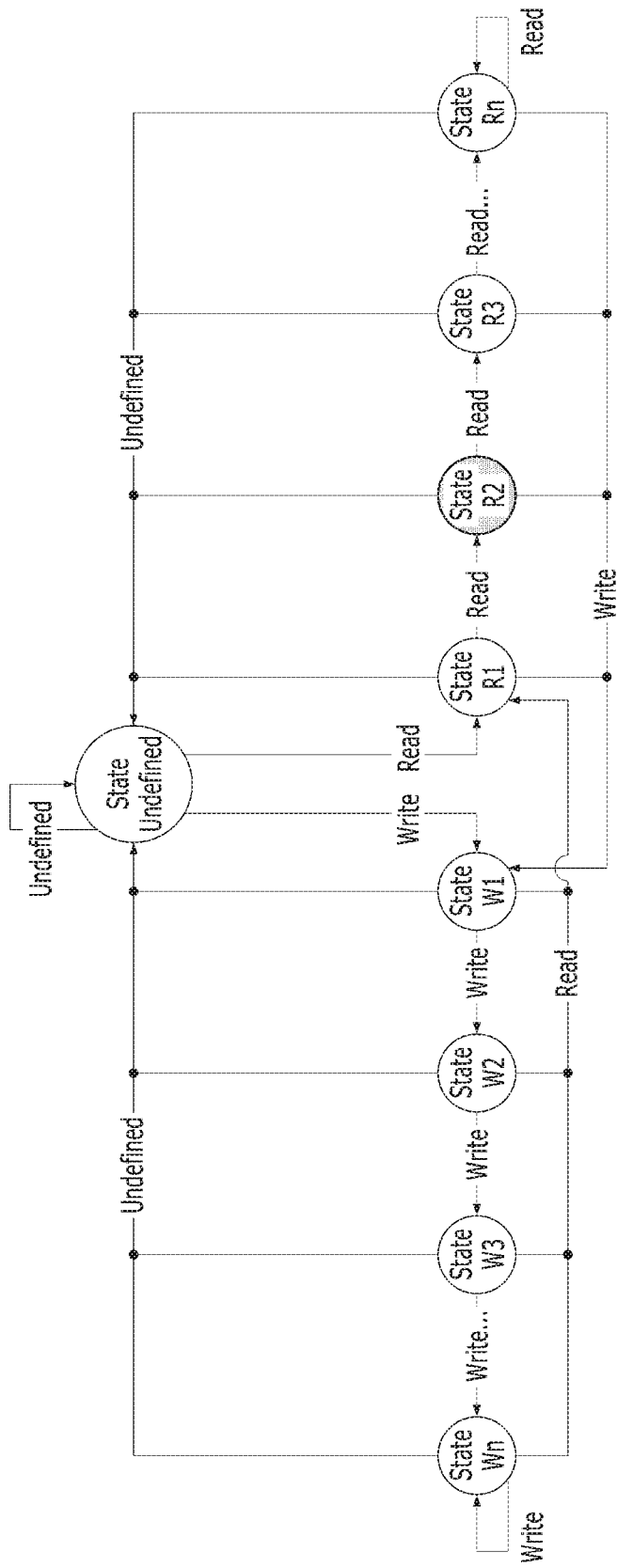
Figure 17B:
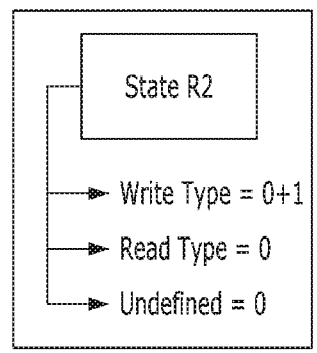
Figure 19A:
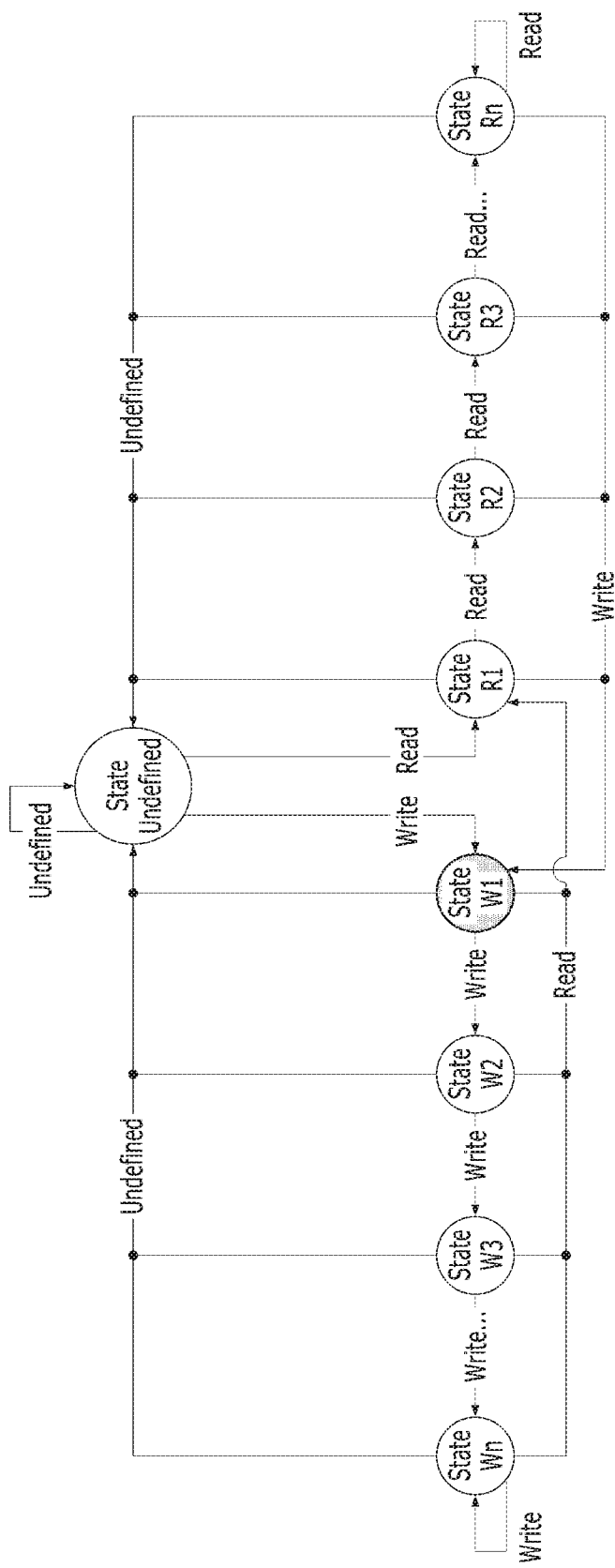
Figure 19B:
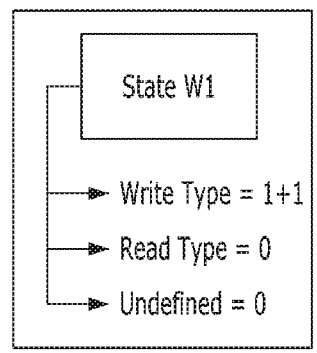
Figure 20A:
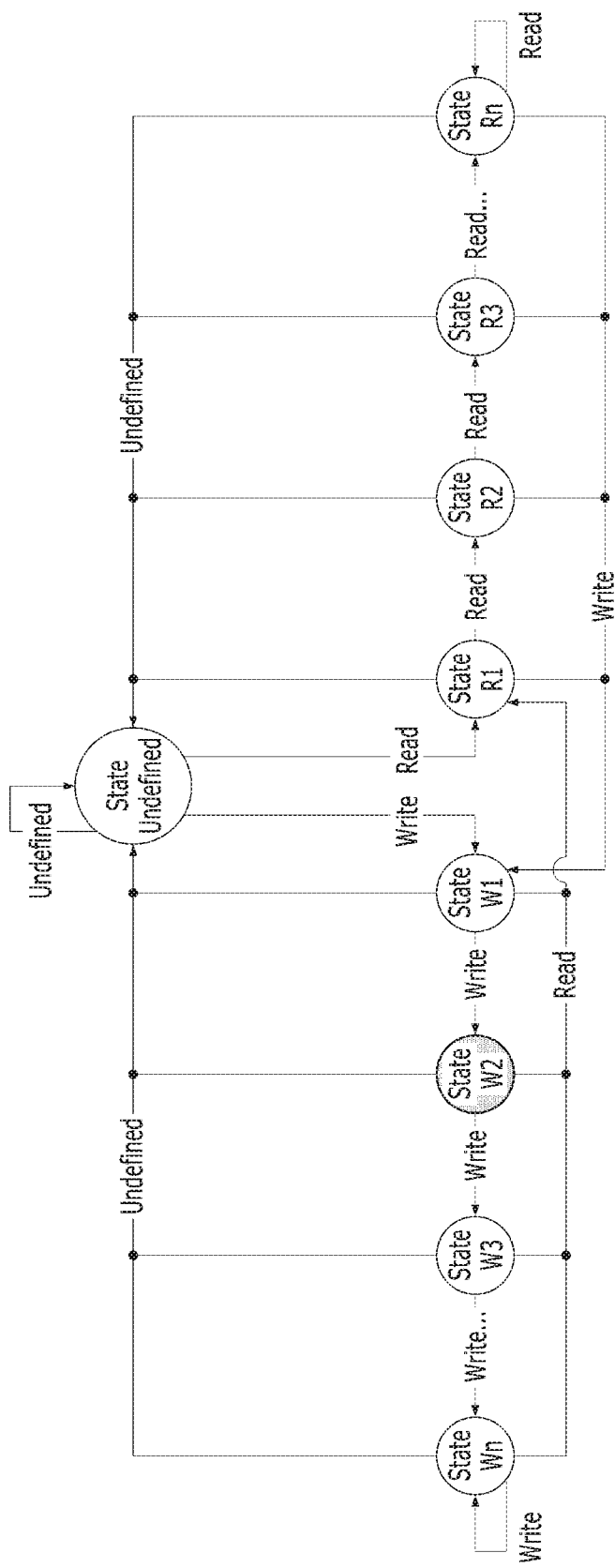
Figure 20B:
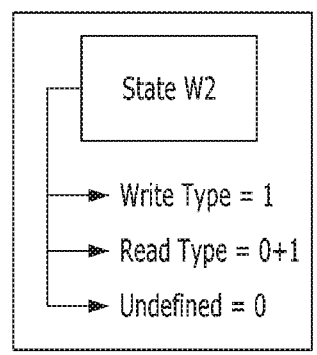
Figure 21A:
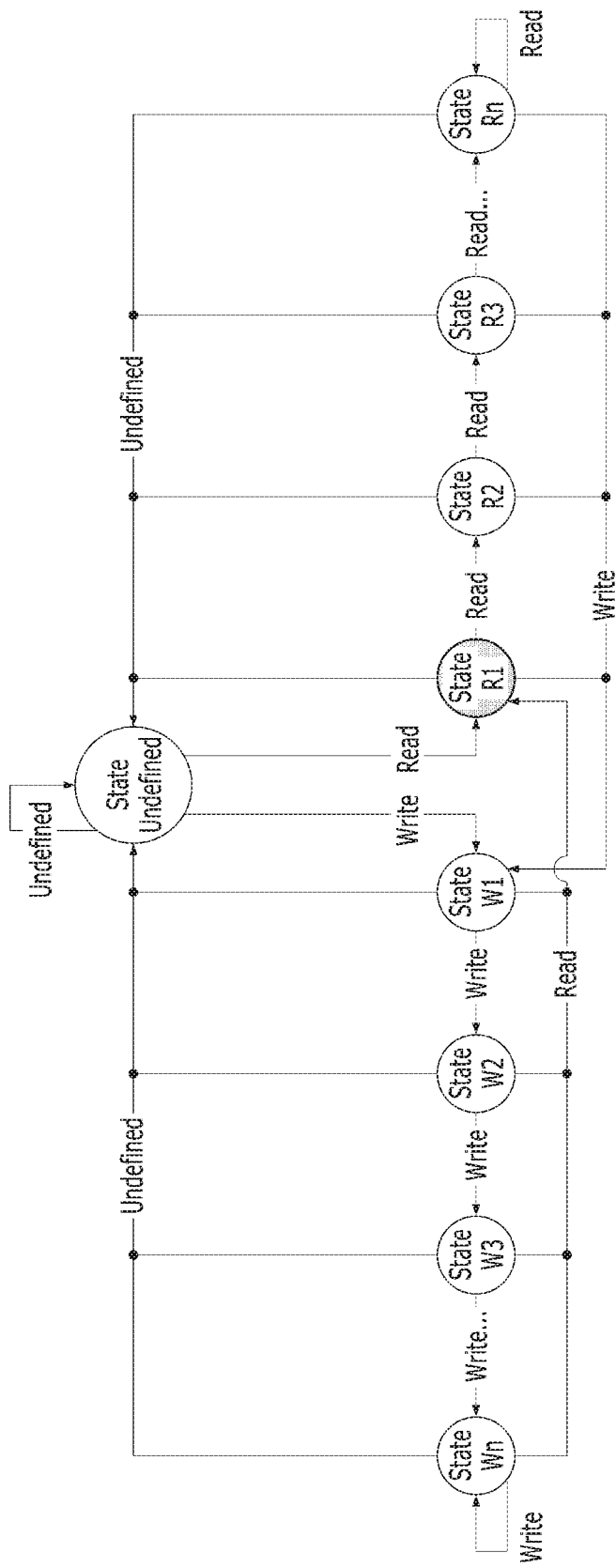
Figure 21B:
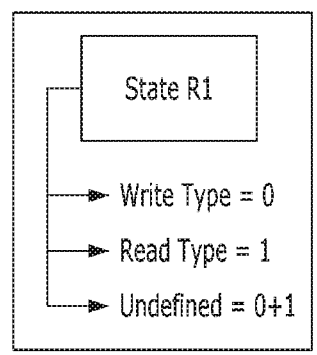
Figure 23:
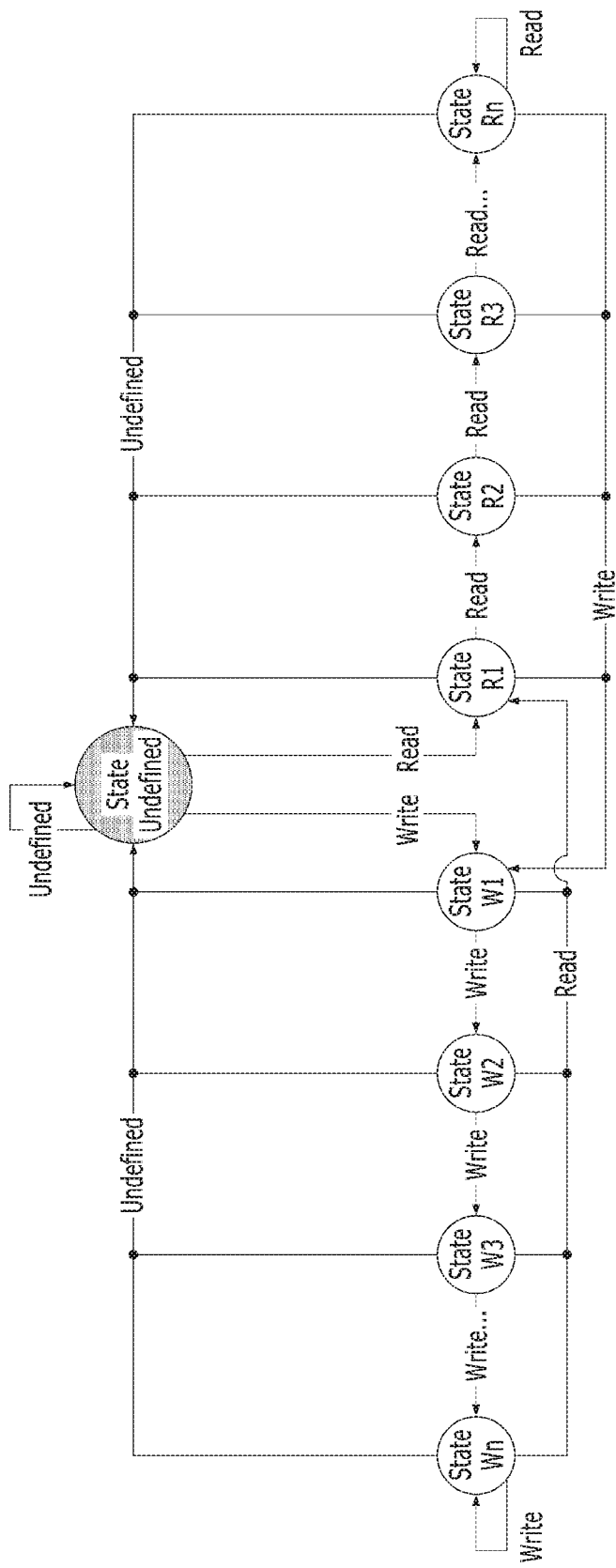
Figure 24:
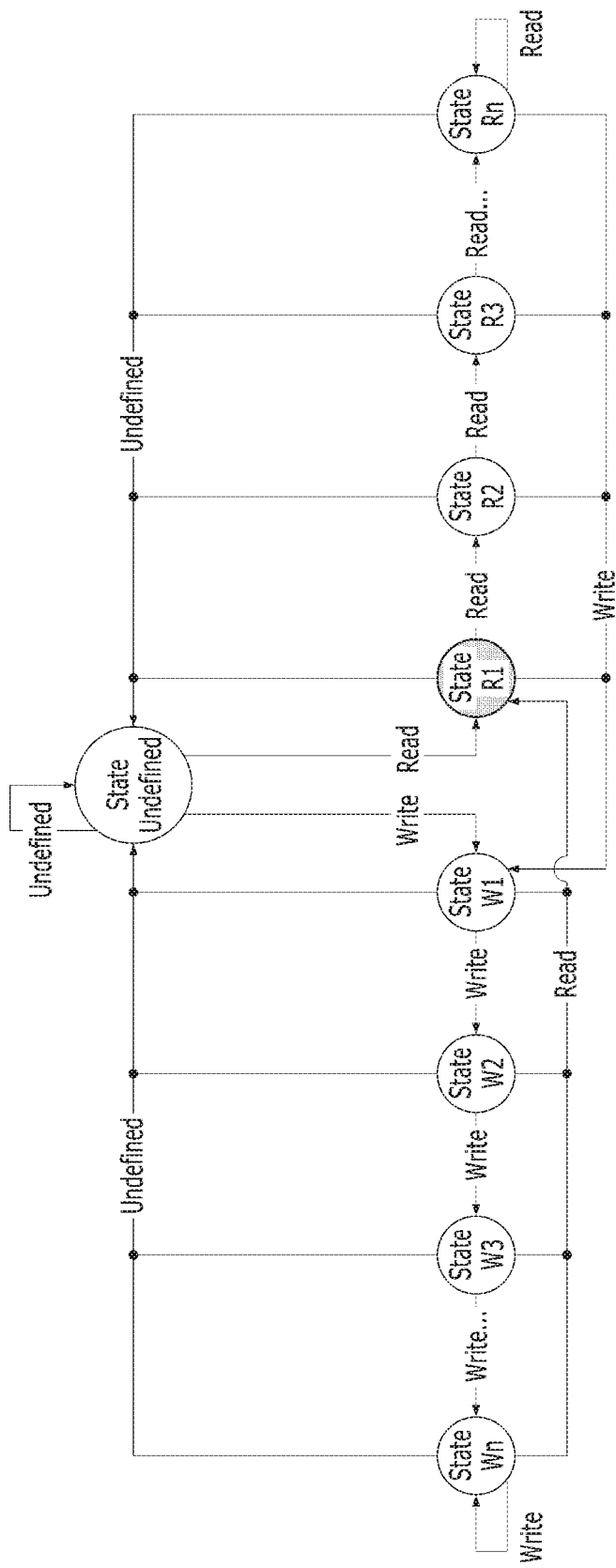

In an initial state, the control component 120 defines the current state as the undefined state UND (see FIGS. 11 and 12). At this state, all counters for each state are equal to zero.

In a window 0, it is assumed that there are 9.5 MB of write commands and 0.5 MB of read commands. The control component 120 characterizes the workload as write intensive (i.e., W: 95%) (see FIG. 11). The control component 120 does not increase any counters of the current state because the current state is the undefined state UND. The control component 120 just moves the current state to the first write state W1, which means that the last 10 MB of commands were more write intensive (see FIGS. 11 and 13A).

In a window 1, it is assumed that there are 9 MB of write commands and 1 MB of read commands. The control component 120 characterizes the workload as write intensive (i.e., W: 90%) (see FIG. 11). The control component 120 checks the current state as the first write state W1 and increases the write counter (i.e., Write Type) of the first write state W1 (see FIG. 13B). Because the target characteristic has not changed, the control component 120 moves the current state W1 to the second write state W2 (see FIGS. 11 and 14A).

In a window 2, it is assumed that there are 9 MB of write commands and 1 MB of read commands. The control component 120 characterizes the workload as write intensive (i.e., W: 90%) (see FIG. 11). The control component 120 checks the current state as the second write state W2 and increases the write counter (i.e., Write Type) of the second write state W2 (see FIG. 14B). Because the target characteristic has not changed, the control component 120 moves the current state W2 to the third write state W3 (see FIGS. 11 and 15A).

In a window 3, it is assumed that there are 9.6 MB of read commands and 0.4 MB of write commands. The control component 120 characterizes the workload as read intensive (i.e., R: 96%) (see FIG. 11). The control component 120 checks the current state as the third write state W3 and increases the read counter (i.e., Read Type) of the third write state W3 (see FIG. 15B). Because the target characteristic has been changed, the control component 120 moves the current state W3 to the first read state R1 (see FIGS. 11 and 16A).

In a window 4, it is assumed that there are 9 MB of read commands and 1 MB of write commands. The control component 120 characterizes the workload as read intensive (i.e., R: 90%) (see FIG. 11). The control component 120 checks the current state as the first read state R1 and increases the read counter (i.e., Read Type) of the first read state R1 (see FIG. 16B). Because the target characteristic has not been changed, the control component 120 moves the current state R1 to the second read state R2 (see FIGS. 11 and 17A).

In FIG. 18, after receiving 50 MB of commands (i.e., after the windows 0 to 4), values of counters of states W1 to W4 and R1 to R4 are shown.

In a window 5, it is assumed that there are 9 MB of write commands and 1 MB of read commands. The control component 120 characterizes the workload as write intensive (i.e., W: 90%) (see FIG. 11). The control component 120 checks the current state as the second read state R2 and increases the read counter (i.e., Read Type) of the second read state R2 (see FIG. 17B). Because the target characteristic has been changed, the control component 120 moves the current state R2 to the first write state W1 (see FIGS. 11 and 19A).

In a window 6, it is assumed that there are 9 MB of write commands and 1 MB of read commands. The control component 120 characterizes the workload as write intensive (i.e., W: 90%) (see FIG. 11). The control component 120 checks the current state as the first write state W1 and increases (i.e., 1+1) the write counter (i.e., Write Type) of the first write state W1 (see FIG. 19B). The write counter of the first write state W1 has been increased as shown in FIG. 13B, and is increased again herein. Because the target characteristic has not been changed, the control component 120 moves the current state W1 to the second write state W2 (see FIGS. 11 and 20A).

In a window 7, it is assumed that there are 9 MB of read commands and 1 MB of write commands. The control component 120 characterizes the workload as read intensive (i.e., R: 90%) (see FIG. 11). The control component 120 checks the current state as the second write state W2 and increases the read counter (i.e., Read Type) of the second write state W2 (see FIG. 20B). Because the target characteristic has been changed, the control component 120 moves the current state W2 to the first read state R1 (see FIGS. 11 and 21A).

In FIG. 22, after receiving 80 MB of commands (i.e., after the windows 0 to 7), values of counters of states W1 to W4 and R1 to R4 are shown.

In a window 8, it is assumed that next 10 MB of commands are mixed: there are 55 MB of read commands and 45 MB of write commands. The control component 120 cannot characterize that the read commands prevail or predominate. The difference between the write commands and the read commands is just 55−45=10%, which is not enough of a margin of difference. That is, the control component 120 cannot characterize that the workload is read or write intensive. In this case, the control component 120 increases the corresponding counter (i.e., Undefined counter) of the first read state W1 (see FIG. 21B), and moves the current state R1 to the undefined state UND (see FIGS. 11 and 23).

In a window 9, it is assumed that there are 9.5 MB of read commands and 0.5 MB of write commands. The control component 120 characterizes the workload as read intensive (i.e., R: 95%) (see FIG. 11). The control component 120 checks the current state as the second write state W2. In this case, the control component 120 does not increase any counters of the current state because the current state is the undefined state UND. Then, the control component 120 moves the current state UND to the first read state R1 (see FIGS. 11 and 24).

In FIG. 25, after receiving 100 MB of commands (i.e., after the windows 0 to 9), values of counters of states W1 to W4 and R1 to R4 are shown.

Although examples of FIG. 11 to FIG. 25 consider the finite state machine including 4 states for each group, embodiments of the present invention will be applied to the finite state machine including states greater than 4 for each group depending on memory resources. By way of example, the finite state machine may include 100 states for each group as shown in FIG. 26A to FIG. 26D.

FIG. 26A to FIG. 26D illustrate counters of a state in a finite state machine (FSM) in accordance with an embodiment of the present invention. For example, it is assumed that the finite state machine includes 100 states for each group, and reaches the last write state W100.

Figure 26A:
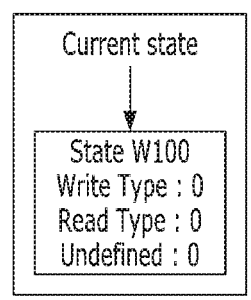
FIG. 26A to FIG. 26D illustrate counters of a state in a finite state machine (FSM) in accordance with an embodiment of the present invention.
Figure 26B:
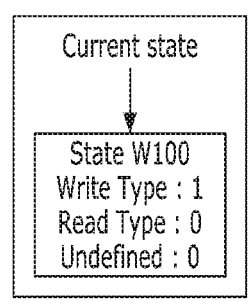
Figure 26C:
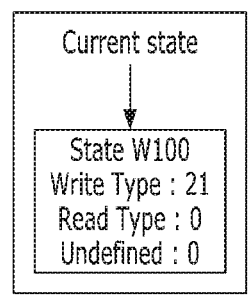
Figure 26D:
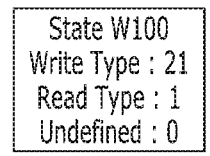

Referring to FIG. 26A, the current state is the write state W100. If the finite state machine reaches the last write state W100, it means that the workload has been write intensive for a long time (e.g., 100 times) and it looks like that the workload will continue to be write intensive.

In the next window, it is assumed that the finite state machine again got more write commands. In this case, the control component 120 of FIG. 5 determines that the workload was write intensive, and increments the corresponding write counter. Thus, the write counter of the write state W100 has a value of 1 (see FIG. 26B). Since the finite state machine does not have the next write state, the finite state machine may just stay in the same state W100.

In the next 20 windows, it is assumed that 200 megabytes of commands were write intensive. In this case, the write counter of the write state W100 are incremented 20 times. Thus, the write counter of the write state W100 has a value of 21 (see FIG. 26C).

In the next window, it is assumed that 10 megabytes of commands were read intensive. In this case, the read counter of the write state W100 is incremented. Thus, the read counter of the write state W100 has a value of 1 (see FIG. 26D). Further, since the target characteristics have changed from write intensive to read intensive, the write state W100 moves to the first read state R1.

FIG. 27A to FIG. 27E illustrate operations for predicting a characteristic of next commands using a finite state machine (FSM) in accordance with an embodiment of the present invention. The operations of FIG. 27A to FIG. 27E may be performed by the predicting module 530 of the control component 120 in FIG. 5.

Referring to FIG. 27A, it is assumed that after receiving many commands, the current state is the write state W1. The current state W1 indicates that a value of the write counter (i.e., WriteType) is 640, a value of the read counter is 3 (i.e., ReadType) and a value of the undefined counter is 15 (i.e., Undefined). By analyzing counter values of the current state W1, the control component 120 gets information that the state W1 has been moved to the state W2 640 times, to the state R1 3 times and to the undefined state 15 times.

The control component 120 determines that the finite state machine was in the write state W1 658 times (i.e., WriteType ReadType+Undefined=640+3+15=658), and the workload was write intensive 640 times. In other words, the control component 120 determines that the workload was write intensive in 98% of the workload using the following Equation (1). Using this information, the control component 120 may predict that the workload will be more write intensive.

$$\frac{WriteType}{WriteType + ReadType + \text{Undefined}} = \frac{640}{658} \sim 0.98 \quad (1)$$

Referring to FIG. 27B, it is assumed that after receiving many commands, the current state is the write state W3. The current state W3 indicates that a value of the write counter (i.e., WriteType) is 4, a value of the read counter is 500 (i.e., ReadType) and a value of the undefined counter is 1 (i.e., Undefined). By analyzing counter values of the current state W3, the control component 120 gets information that the state W3 has been moved to the state W4 4 times, to the state R1 500 times and to the undefined state 1 time.

The control component 120 determines that the finite state machine was in the write state W3 505 times (i.e., WriteType+ReadType+Undefined=4+500+1=505), and the workload was read intensive 500 times. In other words, the control component 120 determines that the workload was read intensive in 99% of the workload using the following Equation (2). Using this information, the control component 120 may predict that the workload will be more read intensive.

$$\frac{ReadType}{WriteType + ReadType + \text{Undefined}} = \frac{500}{505} \sim 0.99 \quad (2)$$

Referring to FIG. 27C, it is assumed that after receiving many commands, the current state is the read state R2. The current state R2 indicates that a value of the write counter (i.e., WriteType) is 258, a value of the read counter is 243 (i.e., ReadType) and a value of the undefined counter is 1 (i.e., Undefined). By analyzing counter values of the current state R2, the control component 120 gets information that the state R2 has been moved to the state W1 258 times, to the state R3 243 times and to the undefined state 1 time.

The control component 120 determines that the finite state machine was in the read state R2 502 times (i.e., WriteType+ReadType+Undefined=258+243+1=502), and the workload was write intensive 258 times. In other words, the control component 120 determines that the workload was write intensive in 51% of the workload using the following Equation (3) and read intensive in 49% of the workload using the following Equation (4). Using these information, the control component 120 may determine that difference of percentages of the workload for write intensive and read intensive does not exceed the margin (10%). In this case, the control component 120 cannot predict whether commands of the next window will be write intensive or read intensive.

$$\frac{WriteType}{WriteType + ReadType + \text{Undefined}} = \frac{258}{502} \sim 0.51 \quad (3)$$

$$\frac{ReadType}{WriteType + ReadType + \text{Undefined}} = \frac{243}{502} \sim 0.49 \quad (4)$$

Referring to FIG. 27D, it is assumed that after receiving many commands, the current state is the read state R3. The current state R3 indicates that a value of the write counter (i.e., WriteType) is 3, a value of the read counter 250 (i.e., ReadType) and a value of the undefined counter is 0 (i.e., Undefined). By analyzing counter values of the current state R3, the control component 120 gets information that the state R3 has been moved to the state W1 3 times, to the state R4 250 times and to the undefined state 0 time.

The control component 120 determines that the finite state machine was in the read state R3 253 times (i.e., WriteType+ReadType+Undefined=3 250+0=253), and the workload was read intensive 250 times. In other words, the control component 120 determines that the workload was read intensive in 99% of the workload using the following Equation (5). Using this information, the control component 120 may predict that the workload will be more read intensive.

$$\frac{ReadType}{WriteType + ReadType + \text{Undefined}} = \frac{250}{253} \sim 0.99 \quad (5)$$

Referring to FIG. 27E, it is assumed that after receiving many commands, the current state is the write state W100. The current state W100 indicates that a value of the write counter (i.e., WriteType) is 21, a value of the read counter is 1 (i.e., ReadType) and a value of the undefined counter is 0 (i.e., Undefined). By analyzing counter values of the current state W100, the control component 120 gets information that the state W100 has been moved to the state W100 21 times, to the state R1 1 time and to the undefined state 0 time.

The control component 120 determines that the finite state machine was in the write state W100 22 times (i.e., WriteType+ReadType+Undefined=21+1+0=22), and the workload was write intensive 21 times. In other words, the control component 120 determines that the workload was write intensive in 95% of the workload using the following Equation (6). Using this information, the control component 120 may predict that the workload will be more write intensive.

$$\frac{WriteType}{WriteType + ReadType + \text{Undefined}} = \frac{21}{22} \sim 0.95 \quad (6)$$

As described above, embodiments of the present disclosure provide a scheme to characterize workload for commands in a current window and predict workload characteristics for commands in a next window. Since the scheme uses a finite state machine (FSM) with counters, embodiments only use limited resources (e.g., CPU and RAM resources). Embodiments may be modified in various ways:

Although embodiments focus on predicting target characteristics such as write intensive and read intensive of commands, the target characteristics may include other characteristics such as read/write or random/sequential.

Also, embodiments may be applied to not only a static window size (e.g., 10 MB) in the examples, but also a dynamic window size depending on target characteristics. In an example, a window size for each state of target characteristics may be increased as windows increase: a window for W1—10 MB, a window for W2—20 MB, and a window for W3—30 MB. In another example, a window size for each group of states may be different: a window W1=W2=W3=10 MB, and a window for R1=R2=R3=20 MB.

Further, the finite state machine may include not only counters for two characteristics in the examples (i.e., write intensive and read intensive), but also other counters, such as "mixed" or "unmap". In examples, "mixed" may represent that the workload is mixed by read and write command, and "unmap" may represent that unmaps commands prevail. In this case, a group of states M1, M2 . . . may be used for the mixed workload and a group of states U1, U2 . . . may be used for the unmap workload.

Furthermore, the minimization procedure may be applied to the finite state machine to save space of memory. Other different structures for prediction may be used such as probabilistic counters, and counters for the ratio between read (R) and write (W). Count of states of each characteristic may be dynamic or static depending on the memory limits and purposes. Several parameters may be optimized to achieve the best tradeoff between the prediction accuracy, performance, and memory overhead: (1) the size of the window of commands, (2) the threshold to determine the type of a window (e.g., write intensive, read intensive, etc.), i.e., the percentage of the most frequent workload in a window, (3) the maximum number of states of a particular workload, (4) the parameters of a state to start the prediction (i.e., the values in the counters controlled by a state).

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A system comprising:
   a memory device; and
   a controller including:
   a receiver suitable for sequentially receiving a plurality of commands for the memory device in a plurality of windows; and
   a control component including a finite state machine suitable for training multiple groups of states based on characteristics of the plurality of windows, and predicting a characteristic of next commands, which is to be received in a next window subsequent to a last window among the plurality of windows, based on the multiple groups of states.

2. The system of claim 1, wherein the control component determines a characteristic of each of the plurality of windows, and updates the multiple groups of states based on the determined characteristics.

3. The system of claim 2, wherein each of the multiple groups of states corresponds to a type of command among the plurality of commands.

4. The system of claim 3, wherein the plurality of commands includes a read command type and a write command type.

5. The system of claim 2, wherein the characteristic of each of the plurality of windows indicates which type of command is predominate in the corresponding window.

6. The system of claim 2, wherein each of the multiple groups of states includes a plurality of counters.

7. The system of claim 6, wherein the number of the is plurality of counters corresponds to the number of types of the plurality of commands.

8. The system of claim 6, wherein the control component:
selects a corresponding group among the multiple groups of states based on the determined characteristic; and
increases a value of a corresponding counter for a current state of the selected group based on the determined characteristic.

9. The system of claim 8, wherein the control component further:
determines, as the current state, a state next to a corresponding state of a previously selected group when the selected group is identical to a previously selected group; and
determines, as the current state, an initial state of the previously selected group when the selected group is different from the previously selected group.

10. The system of claim 6, wherein the control component analyzes the characteristics of the plurality of windows based on the current state, values of counters included in the current state; and predicts the characteristic of the next commands based on the analyzed characteristic of the previous window.

11. A method for operating a memory system including a memory device and a controller, the method comprising:
sequentially receiving a plurality of commands for the memory device in a plurality of windows;
training multiple groups of states using a finite state machine, based on characteristics of the plurality of windows; and
predicting a characteristic of next commands, which is to be received in a next window subsequent to a last window among the plurality of windows, based on the multiple groups of states.

12. The method of claim 11, wherein the training of the multiple groups of states comprises:
determining a characteristic of each of the plurality of windows; and
updating the multiple groups of states based on the determined characteristics.

13. The method of claim 12, wherein each of the multiple groups of states corresponds to a type of command among the plurality of commands.

14. The method of claim 13, wherein the plurality of commands includes a read command type and a write command type.

15. The method of claim 12, wherein the characteristic of each of the plurality of windows indicates which type of commands is predominate in the corresponding window.

16. The method of claim 12, wherein each of the multiple groups of states includes a plurality of counters.

17. The method of claim 16, wherein the number of the plurality of counters corresponds to the number of types of the plurality of commands.

18. The method of claim 16, wherein the updating of the multiple groups of states comprises:
selecting a corresponding group among the multiple groups of states based on the determined characteristic; and
increasing a value of a corresponding counter for a current state of the selected group based on the determined characteristic.

19. The method of claim 18, further comprising:
determining, as the current state, a state next to a corresponding state of a previously selected group when the selected group is identical to a previously selected group; and
determining, as the current state, an initial state of the previously selected group when the selected group is different from the previously selected group.

20. The method of claim 16,
wherein the determining of the characteristic of each of the plurality of windows comprises analyzing the characteristics of the plurality of windows based on the current state, values of counters included in the current state, and
wherein the predicting of the characteristic of next commands comprises predicting the characteristic of the next commands based on the analyzed characteristic of the previous window.

* * * * *